United States Patent
Gulati et al.

(10) Patent No.: US 10,375,713 B2
(45) Date of Patent: Aug. 6, 2019

(54) MULTI-TECHNOLOGY COEXISTENCE IN THE UNLICENSED INTELLIGENT TRANSPORTATION SERVICE SPECTRUM

(71) Applicant: QUALCOMM Incorporated, San Diego, CA (US)

(72) Inventors: Kapil Gulati, Dover, DE (US); Gaurav Gupta, Los Angeles, CA (US); Shailesh Patil, Raritan, NJ (US); Durga Prasad Malladi, San Diego, CA (US); Sudhir Kumar Baghel, Hillsborough, NJ (US); Marco Papaleo, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/644,378

(22) Filed: Jul. 7, 2017

(65) Prior Publication Data

US 2018/0014317 A1    Jan. 11, 2018

Related U.S. Application Data

(63) Continuation-in-part of application No. 15/465,877, filed on Mar. 22, 2017.
(Continued)

(51) Int. Cl.
*H04W 72/12* (2009.01)
*H04L 5/00* (2006.01)
(Continued)

(52) U.S. Cl.
CPC ........ *H04W 72/1215* (2013.01); *G06Q 50/30* (2013.01); *H04L 5/0005* (2013.01);
(Continued)

(58) Field of Classification Search
None
See application file for complete search history.

(56) References Cited

U.S. PATENT DOCUMENTS

2015/0009864 A1   1/2015   Kim et al.
2015/0195827 A1   7/2015   Feng et al.
(Continued)

OTHER PUBLICATIONS

Catt: "Considerations on V2V Traffic Priority and Relative Resource Allocation",3GPP Draft; R1-160366, 3rd Generation Partnership Project (3GPP), Mobile Competence Centre; 650, Route Des Lucioles ; F-06921 SophiaAntipolis Cedex; France, vol. RAN WG1, No. St Julian's, Malta; 20160215-20160219 Feb. 5, 2016 (Feb. 5, 2016), XP051063745, 3 pages, Retrieved from the Internet: URL:http://www.3gpp.org/ftp/tsg_ran/WG1_RL1/TSGR1_84/Docs/ [retrieved on Feb. 5, 2016].

(Continued)

*Primary Examiner* — Diane L Lo
(74) *Attorney, Agent, or Firm* — Arent Fox LLP

(57) ABSTRACT

A framework to manage coexistence of multiple technologies over multiple channels is desired. The apparatus may be a user equipment (UE). The UE detects whether a second technology different from a first communication technology utilized by the UE is active on a first channel. The UE performs, based on the detection, an action associated with assigning the first communication technology to at least one of the first channel or a second channel.

29 Claims, 15 Drawing Sheets

Related U.S. Application Data

(60) Provisional application No. 62/359,902, filed on Jul. 8, 2016, provisional application No. 62/374,685, filed on Aug. 12, 2016.

(51) Int. Cl.

| | | |
|---|---|---|
| *H04W 72/04* | (2009.01) | |
| *G06Q 50/30* | (2012.01) | |
| *H04W 74/08* | (2009.01) | |
| *H04W 16/14* | (2009.01) | |
| *H04L 29/08* | (2006.01) | |
| *H04W 84/18* | (2009.01) | |
| *H04W 28/06* | (2009.01) | |
| *H04W 88/06* | (2009.01) | |

(52) U.S. Cl.
CPC ....... *H04W 16/14* (2013.01); *H04W 72/0446* (2013.01); *H04W 74/0816* (2013.01); *H04L 67/12* (2013.01); *H04W 28/06* (2013.01); *H04W 84/18* (2013.01); *H04W 88/06* (2013.01)

(56) References Cited

U.S. PATENT DOCUMENTS

| | | |
|---|---|---|
| 2016/0014663 A1 | 1/2016 | Berggren et al. |
| 2016/0295589 A1* | 10/2016 | Nikopour .............. H04W 4/023 |
| 2016/0337982 A1 | 11/2016 | Yang et al. |
| 2017/0188391 A1* | 6/2017 | Rajagopal ......... H04W 74/0816 |
| 2017/0230839 A1 | 8/2017 | Cui et al. |
| 2018/0014146 A1 | 1/2018 | Gulati et al. |

OTHER PUBLICATIONS

International Search Report and Written Opinion—PCT/US2017/041229—ISA/EPO—dated Oct. 5, 2017.

LG Electronics: "Discussion on Coexisting LTE-V2V and IEEE802.11p on the Same Carrier", 3GPP Draft; R1-164540 Co-Channel Coexistence with DSRC, 3rd Generation Partnership Project (3GPP), Mobile Competence Centre; 650, Route Des Lucioles; F-06921 Sophia-Antipolis Cedex; France, vol. RAN WG1, No. Nanjing, China; 20160523—20160527, May 14, 2016 (May 14, 2016), XP051096396, pp. 1-6, Retrieved from the Internet: URL: http://www.3gpp.org/ftp/tsg_ran/WG1_RL1/TSGR1_85/Docs/ [retrieved on May 14, 2016].

Samsung: "DSRC Co-Existence with V2V", 3GPP Draft; R1-162702 DSRC Co-Existence With V2V, 3rd 3eneration Partnership Project (3GPP), Mobile Competence Centre; 650, Route Des Lucioles; F-06921 Sophia Antipolis Cedex; France, vol. RAN WG1, No. Busan, Korea; 20160411-20160415, Apr. 2, 2016 (Apr. 2, 2016), XP051080354, 3 Pages, Retrieved from the Internet: URL:http://www.3gpp.org/ftp/tsg ran/WG1_RL1/TSGR1_84b/Docs/ [retrieved on Apr. 2, 2016].

* cited by examiner

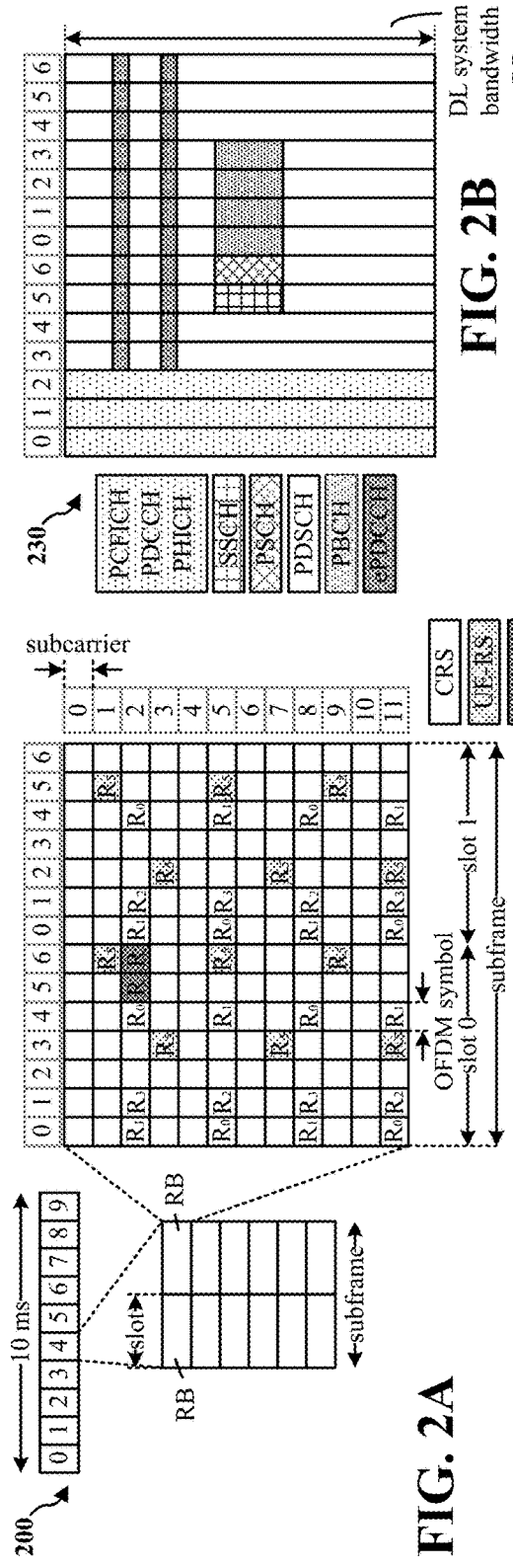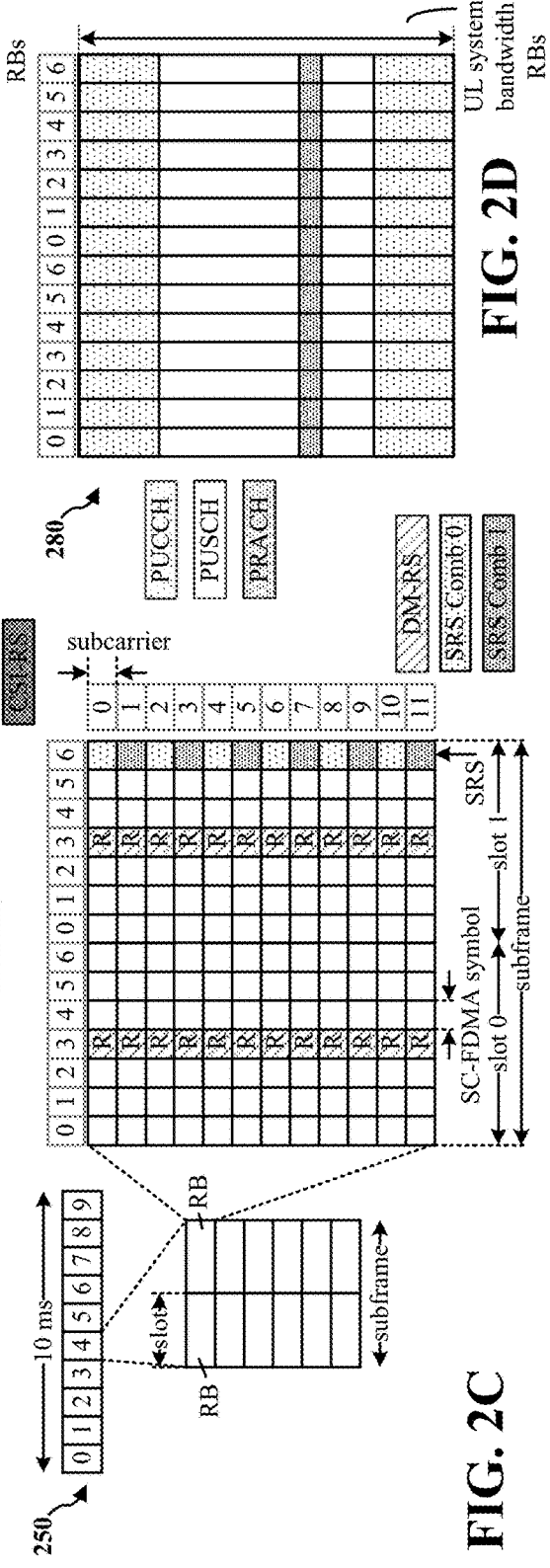

MULTI-TECHNOLOGY COEXISTENCE IN THE UNLICENSED INTELLIGENT TRANSPORTATION SERVICE SPECTRUM

CROSS-REFERENCE TO RELATED APPLICATION(S)

This application is a continuation-in-part application of U.S. application Ser. No. 15/465,877, entitled "DSRC-LTE V2V CO-CHANNEL LONG TERM COEXISTENCE" and filed on Mar. 22, 2017, and claims the benefit of U.S. Provisional Application Ser. No. 62/374,685, entitled "MULTI-TECHNOLOGY COEXISTENCE IN THE UNLICENSED INTELLIGENT TRANSPORTATION SERVICE SPECTRUM" and filed on Aug. 12, 2016, U.S. Provisional Application Ser. No. 62/359,902, entitled "DSRC-LTE V2V CO-CHANNEL LONG TERM COEXISTENCE" and filed on Jul. 8, 2016, which are expressly incorporated by reference herein in its entirety.

BACKGROUND

Field

The present disclosure relates generally to communication systems, and more particularly, to multi-technology coexistence in wireless communication.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A user equipment (UE) utilizing one technology for communication on a channel may detect another technology on the same channel. Thus, a framework to manage coexistence of multiple technologies over multiple channels is desired.

In an aspect of the disclosure, a method, a computer-readable medium, and an apparatus are provided. The apparatus may be a UE. The UE detects whether a second technology different from a first communication technology utilized by the UE is active on a first channel. The UE performs, based on the detection, an action associated with assigning the first communication technology to at least one of the first channel or a second channel.

In an aspect, the apparatus may be a UE. The UE may include means for detecting whether a second communication technology different from a first communication technology utilized by the UE is active on a first channel. The UE may include means for performing, based on the detection, an action associated with assigning the first communication technology to at least one of the first channel or a second channel.

In an aspect, the apparatus may be a UE including a memory and at least one processor coupled to the memory. The at least one processor may be configured to: detect whether a second communication technology different from a first communication technology utilized by the UE is active on a first channel, and perform, based on the detection, an action associated with assigning the first communication technology to at least one of the first channel or a second channel.

In an aspect, a computer-readable medium storing computer executable code may include code to: detect whether a second communication technology different from a first communication technology utilized by the UE is active on a first channel, and perform, based on the detection, an action associated with assigning the first communication technology to at least one of the first channel or a second channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
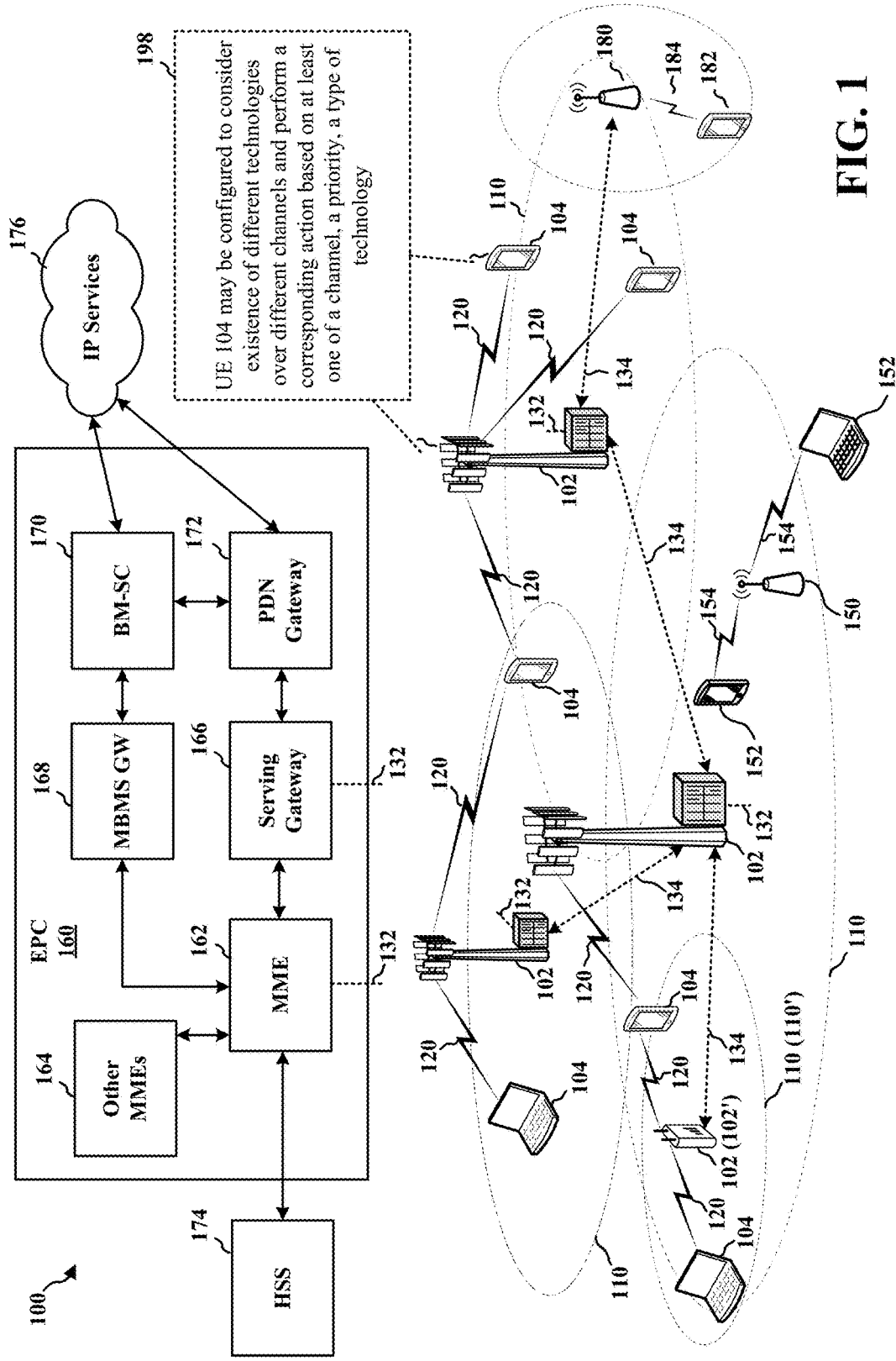
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to consider existence of different technologies over different channels and perform a corresponding action based on at least one of a channel, a priority, a type of technology. (198).

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as R$_0$, R$_1$, R$_2$, and R$_3$, respectively), UE-RS for antenna port 5 (indicated as R5), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
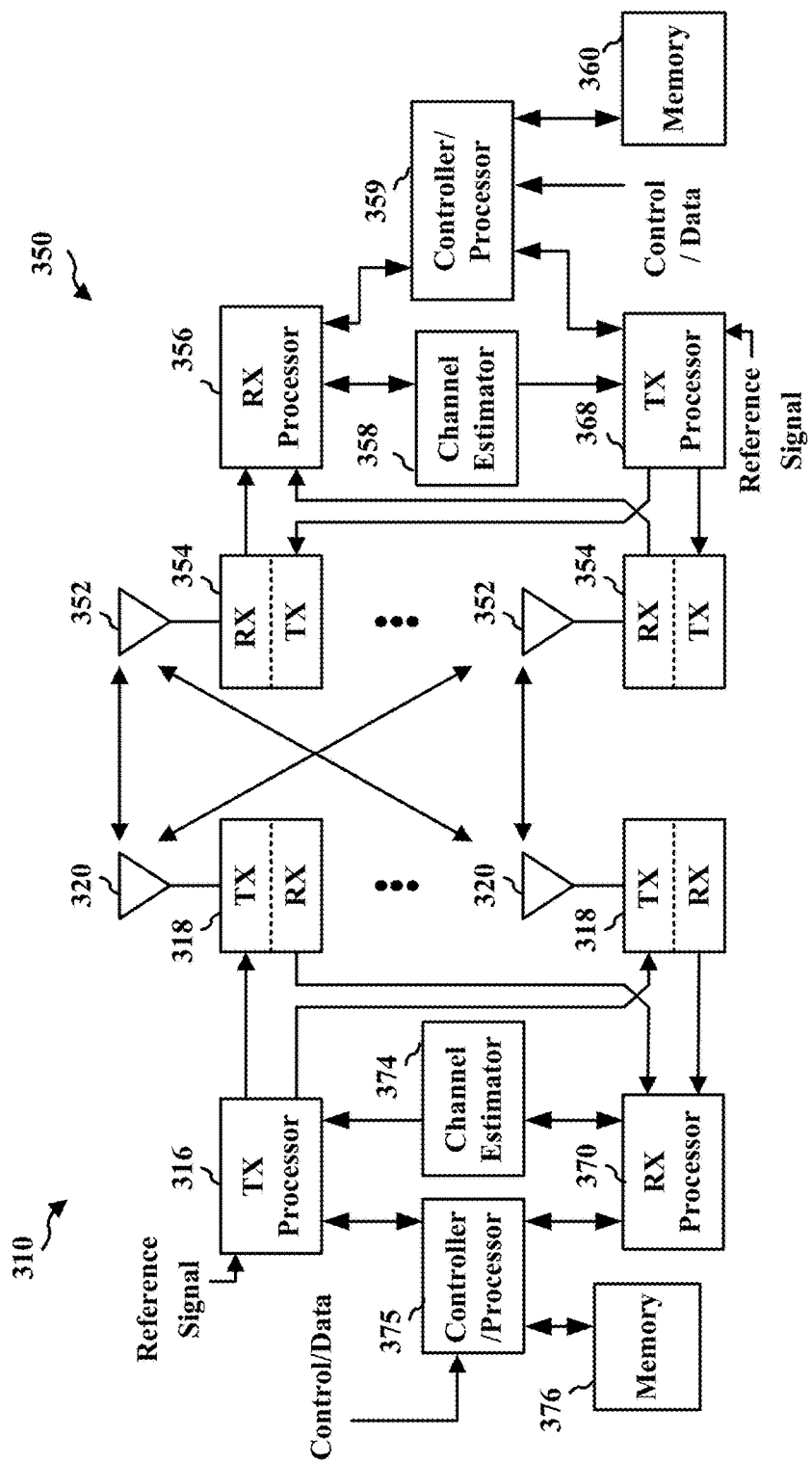
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
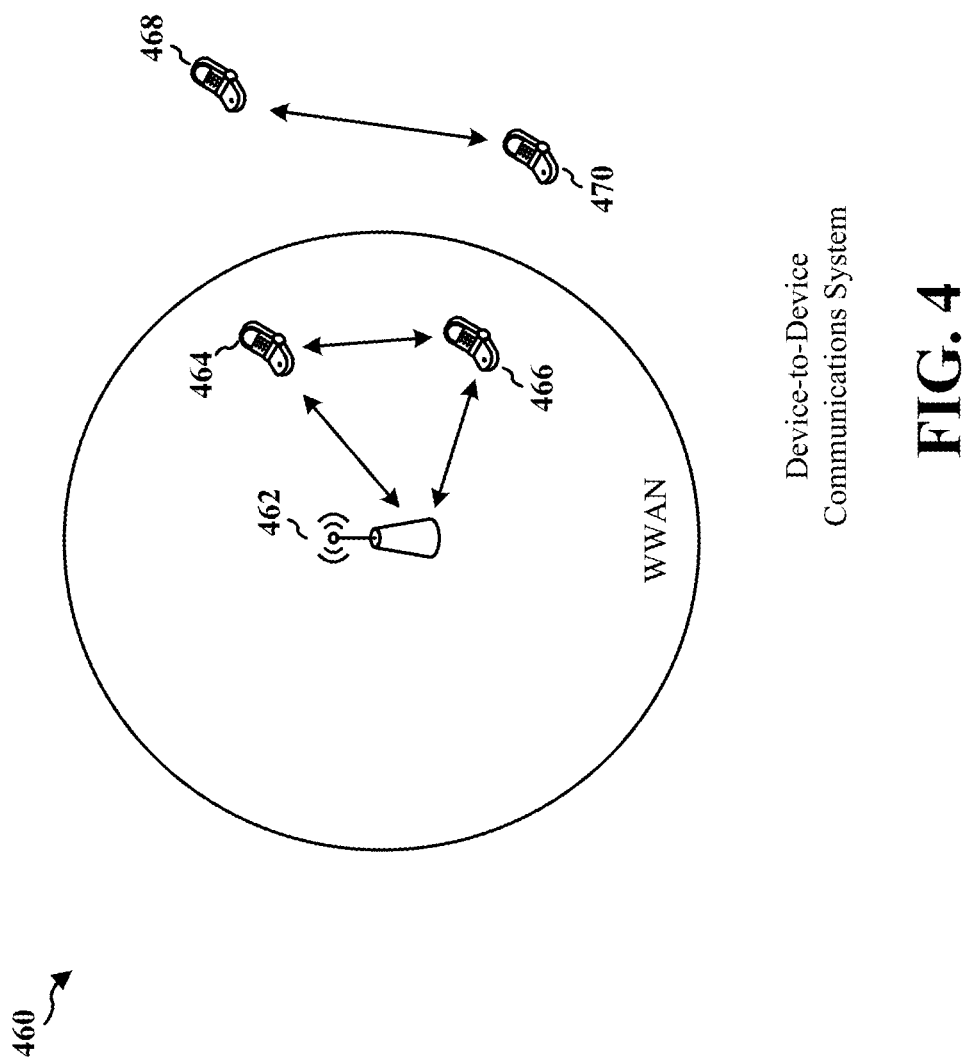
FIG. 4 is a diagram of a device-to-device communications system.

FIG. 4 is a diagram of a device-to-device (D2D) communications system 460. The D2D communications system 460 includes a plurality of UEs 464, 466, 468, 470. The D2D communications system 460 may overlap with a cellular communications system, such as for example, a WWAN. Some of the UEs 464, 466, 468, 470 may communicate together in D2D communication using the DL/UL WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

D2D communication may be used to provide direct communication between devices. D2D communication enables one device to communicate with another device and transmit data to the other device over allocated resources. One use for the D2D communication may include a vehicle-to-vehicle (V2V) communication, vehicle-to-everything (V2X) communication, and vehicle-to-pedestrian (V2P) communication. Thus, according to the V2V communication, a first vehicle's device may perform D2D communication with another vehicle's device. According to the V2X communication or the V2P communication, a vehicle's device may perform D2D communication with another device, regardless of whether that the device resides in a vehicle or not.

One type of communication that may be used for V2V, V2X, or V2P communication is dedicated short range communication (DSRC). The DSRC is a short-range wireless communication capability, typically based on IEEE 802.11p that is similar to Wifi. In the DSRC, before transmission, a device may examine a channel. For transportation-related communications (e.g., V2X or V2P communication), unlicensed spectrum (e.g., at 5.9 GHz) is generally reserved to communicate intelligent transportation services (ITS). Recently, implementing other types of communication such as LTE communication for V2V, V2X, or V2P communication have been under development. For example, LTE direct (LTE-D) may be utilized for V2V, V2X, or V2P communication, over a licensed spectrum and/or an unlicensed spectrum. The LTE V2X communication or V2P communication may be similar to LTE D2D communication. Although the following discussion refers to LTE V2X communication or V2P communication by way of illustration and not limitation, the following discussion may also apply to LTE D2D communication or other types of wireless communication.

Figure 5:
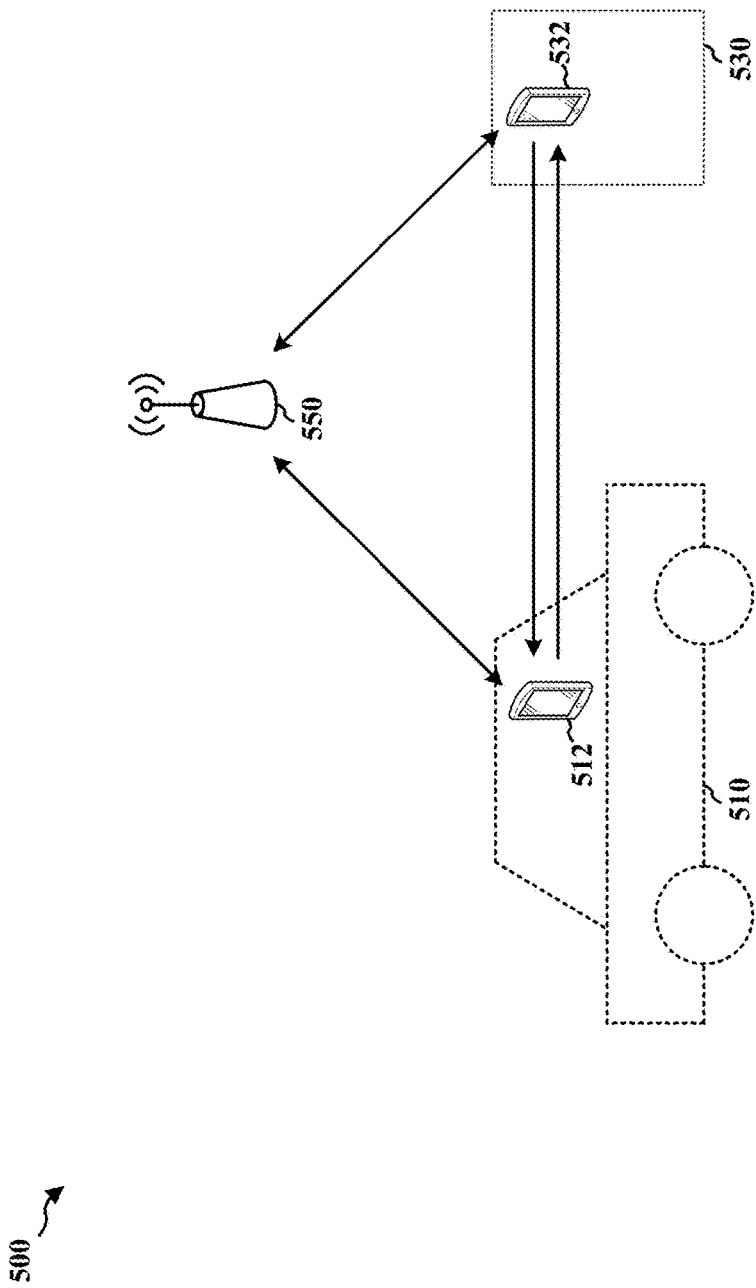
FIG. 5 is an example diagram illustrating device-to device communication between two devices.

FIG. 5 is an example diagram 500 illustrating device-to device communication between two devices. A first device 512 (e.g., UE 532) is present in a first vehicle 510, and thus may travel with the first vehicle 510. A second device 532 (e.g., another UE 532) may be present in an entity 530. The entity 530 may be a second vehicle or a user (e.g., pedestrian). In an aspect, the first device 512 may be present independently from the first vehicle 510 or may be a part of the first vehicle 510. The second device 532 may be present independently from the entity 530, or may be a part of the entity 530. The first device 512 and the second device 532 may be connected (e.g., in connected mode with the base station) to a base station 550. The first device 512 and the second device 532 may also be configured to perform D2D communication with each other over LTE. The first device 512 and the second device 532 may also perform short range communication with each other using DSRC over IEEE 802.11p. Thus, the communication between the first device 512 and the second device 532 may be V2V, V2X, or V2P communication.

As discussed above, several technologies are available to enable wireless communication between two devices. For example, one or more technologies may be utilized for the ITS, e.g., in an unlicensed ITS spectrum. For example, the ITS may include services for safety messages associated with vehicles as well as nonsafety messages. The available technologies may include LTE V2X (e.g., in 3GPP LTE Release 14), DSRC/802.11p, and other types of wireless communication. In various regions, a portion of the unlicensed spectrum may be reserved for ITS service (e.g., 5,855 MHz-5,925 MHz in the US, the European Union, South Korea) with multiple channels (e.g., typically of 10 MHz channel bandwidth) available for ITS safety and non-safety services. When more than one technology are found on the same channel, co-existence of two or more technologies on the same channel should be managed for effective communication. Thus, when multiple channels are available for communication (e.g., in the unlicensed spectrum), an approach to enable multi-technology coexistence within the unlicensed spectrum is desired. For example, a framework to consider coexistence of multiple technologies over multiple channels is desired, especially for long-term coexistence of multiple technologies. The UE may dynamically consider the coexistence of multiple technologies because the UE may not know in advance what technology will utilize certain channels. Although the following description may refer to the ITS service, the following features may be implemented for other types of services.

According to a first aspect of the disclosure, for each technology, a UE may be configured with parameters such as available channels, a geographical area(s) in which the UE is allowed to utilize each available channel, a priority of each available channel, and an action for a current technology utilized by the UE if another technology is detected on an available channel. In an aspect, such a configuration may be for communication in an unlicensed spectrum. Because such a configuration may be per technology, a multi-mode UE capable of utilizing two or more technologies may be configured with a separate configuration for each technology. For example, if the multi-mode UE is capable of utilizing LTE V2V and the DSRC, the multi-mode UE may be configured with a configuration for LTE V2V and a configuration for the DSRC. The configuration for a technology may be provided by at least one of a dynamic configuration or a pre-configuration. The dynamic configuration may include an RRC signal (e.g., from a server or a base station), and/or a signal from an ITS server and/or signaling from an operator-controlled server, and the pre-configuration may include a preconfiguration within the UE and/or via a preconfiguration within a universal integrated circuit card (UICC).

The UE communicating via a first technology may determine whether a second technology is detected on a current channel, and may perform an action based on whether the second technology is detected on the current channel. The action by the UE for the first technology may be one of remaining on the current channel for communication via the first technology, vacating the current channel for communication via the first technology, or performing communication on the current channel in a TDM manner (e.g., by sharing the current channel between the first technology and second technology). If the action is remaining on the current channel, the UE may remain on the current channel with the first technology and continue to communicate via the first technology. If the action is vacating the current channel, the UE may vacate the current channel of the current technology, and may further move to another channel having a lower priority than the current channel for communication via the first technology. If the action is performing communication in a TDM manner, the UE may perform communication via the first technology such that the current channel may be shared between the first technology and the second technology. For example, on the current channel, the UE may use the current channel to perform communication using the first technology during certain time periods and the second technology may use the current channel during other time periods.

In particular, the UE utilizing a first technology on a channel may be configured to perform a particular action if the UE detects a second technology different from the first technology on the channel, where the particular action may be based on at least one of the geographical area that supports usage of the channel, and/or a priority level for the channel. The following table shows an example configuration for a first technology that may utilize three communication channels.

TABLE 1

Example configuration #1

| Channel | Geographical area | Priority | Action if another technology is detected |
|---|---|---|---|
| Ch-1 | Region 1, 2 | 1 | Stay |
| Ch-2 | Region 1, 2 | 2 | Vacate |
| Ch-3 | Region 1 | 3 | TDM |

The example configuration #1 in Table 2 is for the UE utilizing a first technology (e.g., LTE D2D). Channel 1 may be utilized geographical regions 1 and 2, and is associated with priority #1 (e.g., the highest priority). Channel 2 may be utilized in geographical regions 1 and 2, and is associated with priority #2. Channel 3 may be utilized in geographical region 1 and is associated with priority #3 (e.g., lowest priority). For Channel 1, the UE utilizing the first technology to communicate on Channel 1 remains on Channel 1 if a different technology is detected on Channel 1. For Channel 2, if a different technology is detected on Channel 2, the UE utilizing the first technology to communicate on Channel 2 vacates Channel 2 of the first technology and may move the communication using the first technology to Channel 3 that has a lower priority than Channel 2. In one example, after the UE vacates Channel 2 of the first technology upon detection of a second technology, the second technology may occupy Channel 2. For Channel 3, if the UE utilizing the first technology on Channel 3 detects a different technology on Channel 3, the UE communicates on Channel 3 using the first technology and the different technology in a TDM manner. For example, to communicate in the TDM manner, the UE may divide time into a first portion and a second portion, and may communicate using the first technology during the first portion of time and communicate using the second technology during the second portions of time.

In one configuration, the action performed upon detection of another technology may be specific to the another technology detected. For example, the UE currently utilizing a first technology on a particular channel may perform a certain action when a second technology is detected on the particular channel, and may perform a certain action when a third technology is detected on the particular channel. The following is an example of such a configuration.

TABLE 2

Example configuration #2

| Channel | Geographical area | Priority | Action if Tech-A is detected | Action if Tech-B is detected |
|---|---|---|---|---|
| Ch-1 | Region 1, 2 | 1 | Stay | Vacate |
| Ch-2 | Region 1, 2 | 2 | Vacate | Vacate |
| Ch-3 | Region 1 | 3 | TDM | TDM |

In the example configuration #2, the UE is utilizing a first technology (e.g., LTE D2D). Channel 1 may be utilized in geographical regions 1 and 2, and is associated with priority #1 (e.g. a highest priority). Channel 2 may be utilized in geographical regions 1 and 2, and is associated with priority #2. Channel 3 may be utilized in geographical region 1 and is associated with priority #3 (e.g., the lowest priority). For Channel 1, if Technology A is detected on Channel 1, the UE utilizing the first technology to communicate on Channel 1 stays on Channel 1. For Channel 1, if Technology B is detected on Channel 1, the UE vacates Channel 1 of the first technology and may move the communication using the first technology to Channel 2 or 3 that has a lower priority than Channel 1. For Channel 2, if Technology A and/or Technology B are detected, the UE utilizing the first technology to communicate on Channel 2 vacates Channel 2 of the first technology and may move the communication using the first technology to Channel 3 that has a lower priority than Channel 2. In one example, after the UE vacates Channel 2 of the first technology upon detection of a second technology, the second technology may occupy Channel 2. For Channel 3, if Technology A is detected, the UE utilizing the first technology communicates on Channel 3 using the first technology in a TDM manner with Technology A. For Channel 3, if Technology B is detected, the UE utilizing the first technology communicates on Channel 3 using the first technology in a TDM manner with Technology B.

In one configuration, if there are multiple technologies and one technology is preferred over other technologies, the UE utilizing a non-preferred technology on a channel may vacate the channel of the non-preferred technology, regardless of a channel number or priority (e.g., if the UE detects the preferred technology on the same channel). In one example, if there are two technologies including a first technology and a second technology, and the second technology is preferred (e.g., an incumbent technology), the UE utilizing the first technology on a channel vacates the channel of the first technology, regardless of the channel number or channel priority. In this configuration, the first technology may have a configuration, and there may not be an explicit configuration for the second technology. However, because the UE vacates a channel of the first technology when another technology is detected, it is implied that the UE utilizing the second technology stays on the channel even if the first technology is detected. The following is an example of such a configuration.

TABLE 3

Example configuration #3

| Technology 1 (e.g. LTE V2V) | | | Technology 2 (e.g. DSRC/802.11p) | | |
|---|---|---|---|---|---|
| Channel | Priority | Action if another technology is detected | Channel | Priority | Action if another technology is detected |
| Ch-1 | 1 | Vacate | Ch-1 | 1 | Stay |
| Ch-2 | 2 | Vacate | Ch-2 | 2 | Stay |
| Ch-3 | 3 | Vacate | Ch-3 | 3 | Stay |

According to the example configuration #3, the example configuration #3 is provided for a UE utilizing a first technology (e.g., LTE V2V). In this example, because DSRC is preferred over LTE V2V, whenever the UE detects DSRC on any of the channels, the UE vacates the channel for LTE V2V communication. Thus, it is implied that, according to the example configuration #2, the UE utilizing the DSRC on any of the channels will stay on the channel with the DSRC even if LTE V2V is detected on the channel being used for DSRC communication. Even without an actual configuration for the DSRC, the UE utilizing the DSRC on a channel will stay on the channel for DSRC even if LTE V2V is detected at least because according to the example configuration #2, if the UE utilizes the LTE V2V and detects the DSRC on the channel, the UE should vacate the channel of the LTE V2V such that the DSRC may occupy the channel.

In one configuration, the priority for a channel may change depending on technology utilized by the UE. For example, if there are two technologies including a first technology and a second technology, a first channel is associated with a medium priority for the first technology and is associated with a high priority for the second technology, whereas a second channel is associated with a high priority for the first technology and is associated with a medium priority for the second technology. A third channel may be associated with communication via TDM for both the first and second technologies. The following is an example of such a configuration.

TABLE 4

Example configuration #4

| Technology 1 (e.g. LTE-V2V) | | | Technology 2 (e.g. DSRC/802.11p) | | |
|---|---|---|---|---|---|
| Channel | Priority | Action if another technology is detected | Channel | Priority | Action if another technology is detected |
| Ch-1 | 2 | Vacate | Ch-1 | 1 | Stay |
| Ch-2 | 1 | Stay | Ch-2 | 2 | Vacate |
| Ch-3 | 3 | TDM | Ch-3 | 3 | TDM |

According to the example configuration #4, the example configuration #4 is provided for a case where a UE is utilizing a first technology (e.g., LTE V2V) and a case where a UE is utilizing a second technology (e.g., DSRC). For the UE utilizing LTE V2V, Channel 1 is associated with priority #2 and the UE is configured to vacate Channel 1 of LTE V2V if another technology (e.g., DSRC) is detected on Channel 1. For the UE utilizing LTE V2V, Channel 2 is associated with priority #1 and the UE is configured to stay on Channel 2 even if another technology (e.g., DSRC) is detected on Channel 2. For the UE utilizing the DSRC, Channel 1 is associated with priority #1 and the UE is configured to stay on Channel 1 even if another technology (e.g., LTE V2V) is detected on Channel 1. For the UE utilizing the DSRC, Channel 2 is associated with priority #2 and the UE is configured to vacate Channel 2 if another technology (e.g., LTE V2V) is detected on Channel 2. For the UE utilizing the LTE V2V and the UE utilizing the DSRC, Channel 3 is associated with priority #3 and the UE is configured to communicate using two technologies (e.g., both LTE V2V and the DSRC) via TDM.

When a density of UEs (e.g., a number of UEs in a given area) using a second technology on a channel is low, a UE utilizing a first technology on the channel may fail to detect use of the second channel by the second technology, although the second technology is active on the channel. Such a failure to detect the second technology on the channel may adversely impact the performance of the UE and/or a communication system involving the UE because the UE may fail to perform an action configured for a case where the second technology is active on the channel. For example, a UE utilizing LTE V2V on the channel may be configured to vacate the channel of LTE V2V upon detection of the DSRC on the channel. However, if a number of UEs utilizing the DSRC on the channel is low (e.g., 2-3 UEs per geographical area), then the UE utilizing LTE V2V may not be able to detect the DSRC on the channel if the UE utilizing LTE V2V is not close to a UE utilizing the DSRC on the channel, although the DSRC may be active on the channel. Thus, relying solely on the UE's capability to detect the DSRC may not be sufficient for reliable detection of the DSRC. Therefore, configuring UEs to communicate with each other about detection of another technology on a particular channel may be desired.

Thus, according to a second aspect of the disclosure, if a UE utilizing a first technology for communication on a channel detects another technology on the channel, the UE may broadcast a message indicating that the UE detected another technology on the same channel. In an aspect, if a UE utilizing a technology for communication on a channel detects another technology on the channel and the configured action for the channel is to vacate or to utilize TDM, then the UE may transmit (e.g., broadcast) a message indicating that the UE detected another technology and is taking the action (e.g., vacate or TDM) as configured. The UE may broadcast the message to other UEs within proximity of the UE. In an aspect, a UE utilizing the first technology on a channel may receive a message from a second UE where the message indicates that the second UE utilizing the first technology on the same channel detected another technology on the same channel and is taking a configured action (e.g., vacate or TDM). In an aspect, if the UE utilizing the first technology on a channel receives a message indicating that the second UE will vacate the channel of the first technology, the UE may determine another technology is detected on the channel. In an aspect, if the UE utilizing the first technology on a channel receives no message indicating that the second UE will vacate the channel of the first technology, the UE may determine that another technology is not detected on the channel. In an aspect, the UE utilizing the first technology on the channel may determine that a second technology is detected on the same channel and may perform a configured action for the channel if the UE itself determines that the second technology is detected on the same channel and/or additionally receives from a second UE a message indicating that the second technology on the same channel is detected.

In an aspect, the UE utilizing the first technology on a channel may determine that another technology is detected on the same channel if the UE receives at least M messages from respective UEs, where M is a message number threshold and where each message indicates detection of another technology on the channel by a respective UE. For example, if M is 3 and the UE utilizing the first technology on a channel receives two messages (e.g., from two respective UEs) indicating detection of another technology on the channel, the UE may determine that another technology is not detected on the channel and may not perform the action configured for a case where another technology is detected. In another example, if M is 3 and the UE utilizing the first technology on a channel receives four messages (e.g., from four respective UEs) indicating detection of another technology on the channel, the UE may determine that another technology is detected on the channel and may perform the action configured for a case where another technology is detected.

In an aspect, after receiving the message from the second UE, the UE may relay the message to another UE. In an aspect, the UE may determine to relay the message if a relay hop count is less than a relay hop count limit N, which may be a preconfigured number. On the other hand, the UE may determine not to relay the message if a relay hop count is greater than or equal to the relay hop count limit N. The relay hop count may be included in the message. For example, every time a message is relayed to another UE, the relay hop count is increased by an increment (e.g., increased by 1). The relay hop count may start as 0 when the message has not been relayed. If the UE sends the message to the second UE, and the second UE determines to relay the message, the relay hop count is increased from 0 to 1, and is included in the relayed message. Further, if a third UE receives the relayed message from the second UE and determines to relay the message, the relay hop count is increased from 1 to 2 and is included in the relayed message.

If a UE utilizing a first technology on a high priority channel vacates the high priority channel of the first technology upon detection of another technology on the high priority channel, the UE may move communication using the first technology to a lower priority channel. However, having the UE continue to utilize the first technology on the lower priority may not be desirable, especially if the higher priority channel becomes free of use by other technologies later. Therefore, a feature to check whether a higher priority channel is available may be desired.

Thus, according to a third aspect of the disclosure, if a UE utilizing a first technology is not utilizing the first technology on a high priority channel (e.g., highest priority channel) or is utilizing the first technology on a lowest priority channel, then the UE may be configured to periodically check availability of one or more higher priority channels. In an aspect, the UE may start periodically checking availability of a higher priority channel when a predefined time (e.g., $T_{vacate}$) has passed after vacating a higher priority channel of the first technology. For example, when $T_{vacate}$ (e.g., 10 seconds) expires after vacating a higher priority channel of the first technology, the UE may start to periodically check availability of the higher priority channel. In an aspect, the UE may periodically check availability of a higher priority channel during a configured time slot for each time period. For example, the UE may check availability of a higher priority channel periodically at every Nth_period (e.g., every 1 second). During every Nth_period, the UE may check availability of the higher priority channel during a checking time slot N_duration (e.g., a 1 msec duration). The time slots may be synchronized among all UEs using the same technology.

In an aspect, if a UE is a multi-mode UE capable of utilizing two or more technologies for communication, the multi-mode UE may be configured not to utilize any technology for communication on the higher priority channel being checked for availability during the checking time slots. For example, if a UE that is checking for availability for the first technology on a high priority channel transmits using the second technology on the high priority channel, the UE may detect the second technology and thus may determine that the high priority channel is unavailable for the first technology. Thus, in an aspect, a UE that is listening on the high priority channel (e.g., to check availability of the high priority channel) should not transmit on the high priority channel. For example, a UE with both the DSRC and LTE V2V capability may have vacated a high priority channel of LTE V2V, but may be utilizing the DSRC on the high priority channel while utilizing LTE V2V on a low priority channel. Then, the multi-mode UE should not utilize the DSRC or LTE V2V on the high priority channel that is being checked for availability during the checking time slots.

If the UE does not detect another technology on the higher priority channel for a predefined number (e.g., Nslots_free) of the checking time slots, the UE may determine that the higher priority channel is available. In an aspect, Nslots_free may be adjustable. In particular, the UE may increase Nslots_free (e.g., exponentially) if the UE determines the higher priority channel to be available, but later vacates the higher priority channel of the first technology within a certain time window (e.g., $T_{vacate}$) after determining the higher priority channel to be available. In one example, a minimum Nslots_free value may be 1 and a maximum Nslots_free value may be 20, such that the Nslots_free value may be initially set to 1, and may be increased up to 20.

According to a fourth aspect of the disclosure, the UE utilizing a channel with a first technology may detect another different technology based on several approaches. According to a first approach, the UE may detect a different technology on a channel by detecting a sequence that is a part of a transmission via the different technology on the channel, where the sequence is transmitted using the different technology. Such a sequence may include, for example, a preamble sequence of DSRC/802.11p or pilots for demodulation (demodulation reference symbols) for command and control vehicle (C-C2V). Thus, for example, the detected sequence may be specific to a particular technology.

According to a second approach, the UE utilizing a channel with a first technology may detect another different technology by detecting a sequence that indicates the different technology, where the sequence may be a periodically transmitted sequence. In particular, if a second UE transmits a data packet using the different technology, the second UE may periodically transmit the sequence indicating the different technology. In one example, a second UE will periodically transmit the sequence if the second UE has transmitted data within the last time interval (e.g. within the last 1 second). Thus, for example, the second UE may periodically transmit the sequence such that the UE may detect the different technology based on the transmitted sequence, if the second UE has transmitted data within the last 1 second.

According to a third approach, the UE may detect another technology by observing the received energy that exceeds a configured technology threshold, and the fraction of the received energy that the UE was able to decode using the UE's own technology on the channel. If the fraction falls below a configured technology threshold, then the UE determines presence of another technology. In one example, the third approach may be expressed as:

$$\frac{\left(\sum_{iP=0}^{MW/Tp} 1_{(Ed > F_1(e.g.,0.9)*Ec)} 1_{(Ec > Th)}\right)}{\sum_{iP=0}^{MW/Tp} 1_{(Ec > Th)}} < Th_1 (e.g., 0.75),$$

Tp (probe time)=minimum symbol time across the coexisting technologies,
MW=measurement window,
Ec=Received energy in Tp,
Ed=Decoded energy per Tp.

In the above example, the UE utilizing a first technology may detect another technology on a channel by considering energy instances where received energy (Ec) on the resources is greater than an energy threshold (Th) and decoded instances where the decoded energy (Ed) indicates that a signal can be decoded (e.g., using the first technology on the channel) for the resources with energy (Ec) greater than a threshold (Th), per probe time (Tp). If the ratio of the decode instances to the energy instances falls below a technology threshold ($Th_1$), then the UE determines that another technology is present on the channel, in addition to the first technology utilized by the UE. If the ratio of the decode instances to the energy instances does not fall below the technology threshold ($Th_1$), then the UE may determine that another technology is not present and may determine that only the first technology utilized by the UE is present.

Figure 6:
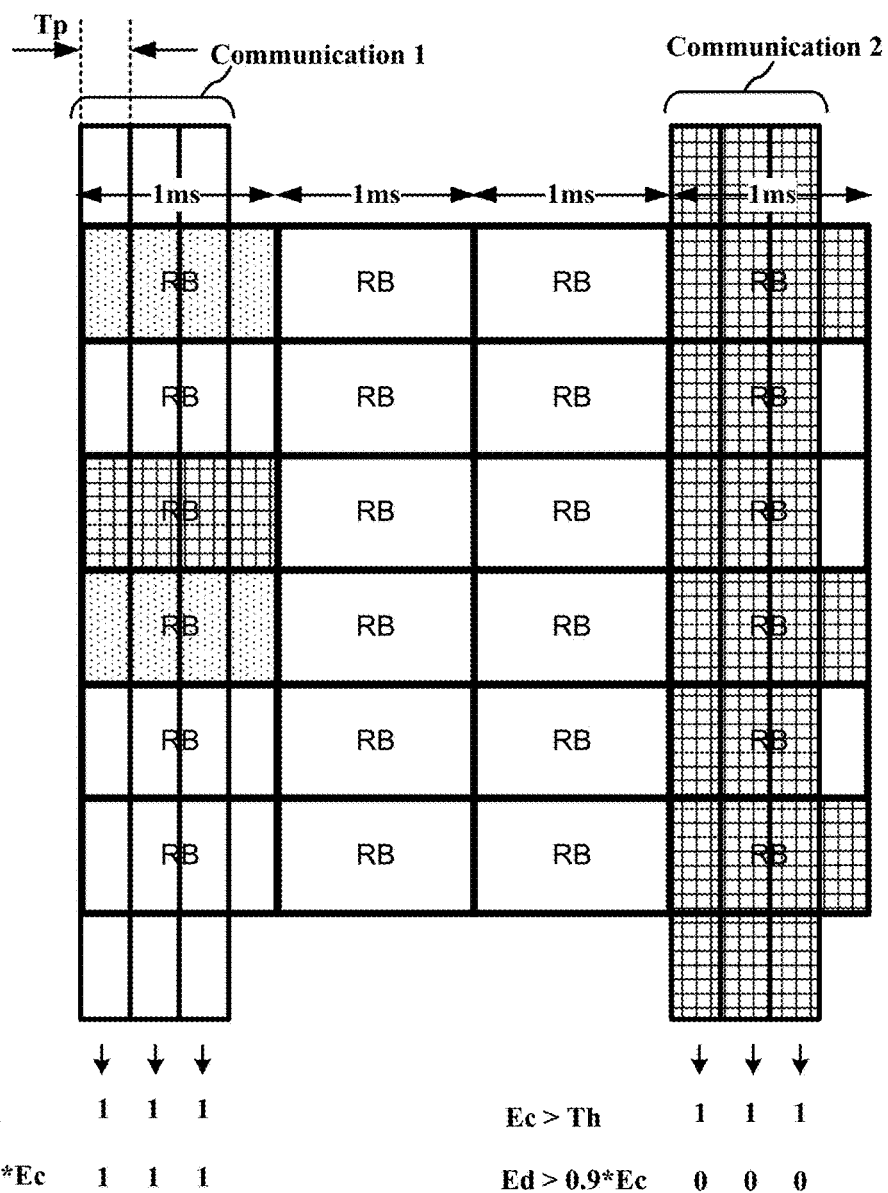
FIG. 6 is an example diagram illustrating a portion of a downlink frame structure utilized for communication.

FIG. 6 is an example diagram 600 illustrating a portion of a downlink frame structure utilized for communication. In the example diagram 600, the UE performs communication 1 and communication 2 via different portions of the resource block (RB). Each of communication 1 and communication 2 is divided into three probes, where each probe has a probe time of Tp. The dotted portions represent decoded communication by the UE utilizing the first technology and the checkered portion, and the checkered portions represent communication that was not decoded by the UE utilizing the first technology. During communication 1, for each probe instance, because there was communication, the received energy (Ec) is greater than the energy threshold (Th). Further, during communication 1, for each probe instance, because at least some communication has been decoded by the UE utilizing the first technology, the decoded energy (Ed) is greater than 0.9*Ec. During communication 2, for each probe instance, because there was communication, the received energy (Ec) is greater than the energy threshold (Th). However, during communication 2, for each probe instance, because no communication has been decoded by the UE utilizing the first technology, the decoded energy (Ed) is not greater than 0.9*Ec. The probe instances for Ec>Th and Ed>0.9*Ec may be used to determine whether another technology is detected, according to the above expression.

Figure 7:
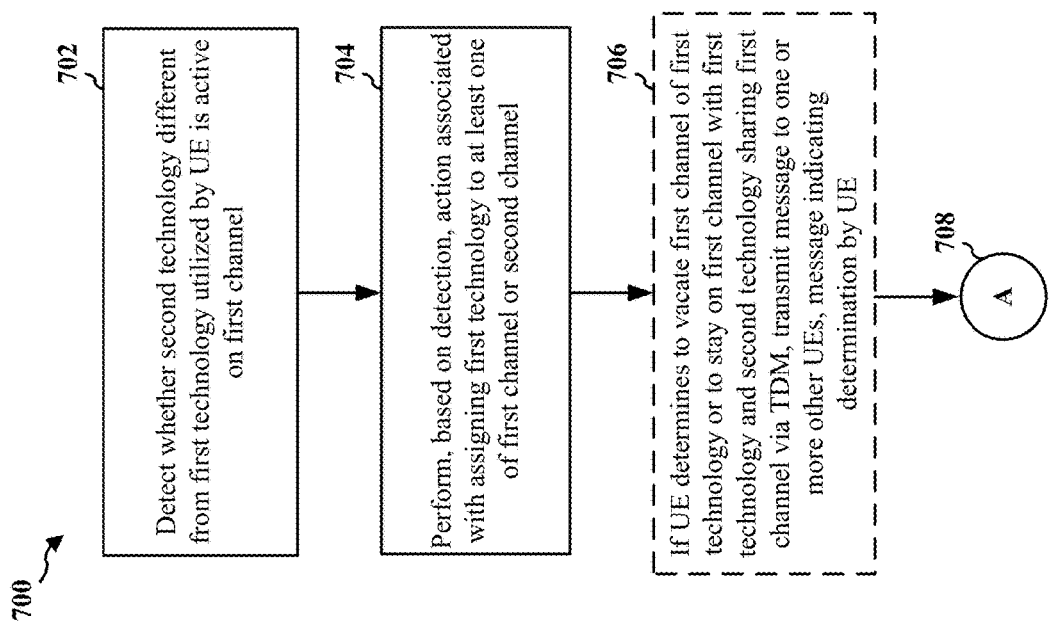
FIG. 7 is a flowchart of a method of wireless communication.

FIG. 7 is a flowchart 700 of a method of wireless communication. The method may be performed by a UE (e.g., the UE 532, the apparatus 1402/1402'). At 702, the UE detects whether a second communication technology different from a first communication technology utilized by the UE is active on a first channel. For example, as discussed supra, the UE communicating with a first technology may determine whether a second technology is detected on a current channel, and may perform an action based on whether the second technology is detected on the current channel. In an aspect, the UE may determine whether the second communication technology is active on the first channel by monitoring for one or more messages indicating that at least one another UE has determined to vacate the first channel of the first communication technology or to stay on the first channel with the first communication technology and the second communication technology sharing the first channel via TDM, where the detecting whether the second communication technology is active on the first channel is based on the one or more messages. For example, as discussed supra, a UE utilizing the first technology on a channel may receive a message from a second UE where the message indicates that the second UE utilizing the first technology on the same channel has detected another technology on the same channel and is taking a configured action (e.g., vacate or TDM). In such an aspect, the UE may detect whether the second communication technology is active on the first channel further by: if one or more messages indicating that at least one another UE has determined to vacate the first channel of the first communication technology are received, determining that the second communication technology is detected on the first channel, and if no message indicating that another UE has determined to vacate the first channel of the first communication technology is received, determining that the second communication technology is not detected on the first channel. For example, as discussed supra, if the UE utilizing the first technology on a channel receives a message indicating that the second UE using the first communication technology will vacate the channel of the first technology, the UE may determine another technology is detected on the channel. For example, as discussed supra, if the UE utilizing the first technology on a channel receives no message indicating that a second UE using the first communication technology will vacate the channel of the first technology, the UE may determine that another technology is not detected on the channel.

In an aspect, the UE may detect whether the second communication technology is active on the first channel by receiving a sequence indicating the second communication technology. For example, as discussed supra, the UE utilizing a channel with a first technology may detect another different technology by detecting a sequence that indicates the different technology, where the sequence may be a periodically transmitted sequence. In an aspect, the UE may detect whether the second communication technology is active on the first channel by receiving a sequence unique to the second communication technology. For example, as discussed supra, the UE may detect a different technology on a channel by detecting a sequence that is a part of a transmission using a different technology on the channel, where the detected sequence may be specific to the particular different technology.

In an aspect, the UE may detect whether the second communication technology is active on the first channel by: identifying, on the first channel, one or more resources whose energy levels are greater than an energy threshold, determining that the second communication technology is detected on the first channel if a fraction based on an amount of decodable energy of the one or more resources on the first channel and an overall energy of the one or more resources is less than an fraction threshold, and determining that the second communication technology is not detected on the first channel if the fraction based on the amount of the decodable energy of the one or more resources on the first channel and the overall energy of the one or more resources is greater than the fraction threshold. For example, as discussed supra, the UE may detect another technology by observing the received energy that exceeds a configured technology threshold, and the fraction of the received energy that the UE was able to decode using the UE's own technology on the channel. For example, as discussed supra, if the fraction falls below a configured technology threshold, then the UE determines presence of another technology.

At 704, the UE performs, based on the detection, an action associated with assigning the first communication technology to at least one of the first channel or a second channel. For example, as discussed supra, the UE communicating with a first technology may determine whether a second technology is detected on a current channel, and may perform an action based on whether the second technology is detected on the current channel. In an aspect, the UE may perform the action by determining, based on the detection, whether to stay on a first channel with the first communication technology, or to vacate the first channel of the first communication technology, or to stay on the first channel with the first communication technology and the second communication technology sharing the first channel via TDM, where the action is performed based on the determination. For example, as discussed supra, the action by the UE for a first technology may be one of staying on the current channel with the first technology, vacating the current channel of the first technology, or performing communication in a TDM manner (e.g., by sharing the current channel between the first technology and second technology).

In an aspect, the determination may be based on configuration information provided to the UE, the configuration information including at least one of: priority levels of the first channel and second channel for the first communication technology, one or more geographical areas in which the first channel is allowed to be used, one or more geographical areas in which the second channel is allowed to be used, or an action to be performed upon detection of the second communication technology on each of the first and second channels. For example, as discussed supra, the UE utilizing a first technology on a channel may be configured to perform a particular action if the UE detects a second technology different from the first technology on the channel, where the particular action may be based on at least one of the geographical area that supports usage of the channel, and/or a priority level for the channel. For example, as discussed supra with reference to Table 1, for Channel 2, if a different technology is detected on Channel 2, the UE utilizing the first technology to communicate on Channel 2 vacates Channel 2 of the first technology and may move the communication using the first technology to Channel 3 that has a lower priority than Channel 2, where Channel 2 may be utilized in geographical regions 1 and 2 Channel 3 may be utilized in geographical region 1. In such an aspect, the action may be based on a type of the second communication technology. For example, as discussed supra, the action performed upon detection of another technology may be specific to the another technology detected. In such an aspect, the configuration information may be based on at least one of pre-configuration within the UE or dynamic configuration via a received configuration message. In such an aspect, the pre-configuration may be performed via at least one of the UE or a UICC, and the dynamic configuration is performed based on at least one of RRC signaling from a base station, signaling from an ITS sever, or signaling from an operator-controlled server. For example, as discussed supra, the configuration for a technology may be provided by at least one of a dynamic configuration or a pre-configuration. For example, as discussed supra, the dynamic configuration may include an RRC signal (e.g., from a server or a base station), and/or a signal from an ITS server and/or signaling from an operator-controlled server, and the preconfiguration may include preconfiguration within the UE and/or via a UICC.

In an aspect, at 706, if the UE determines to vacate the first channel of the first communication technology or to stay on the first channel with the first communication technology and the second communication technology sharing the first channel via TDM, the UE may transmit a message to one or more other UEs, the message indicating the determination by the UE. For example, as discussed supra, if a UE utilizing a technology for communication on a channel detects another technology on the channel and the configured action for the channel is to vacate or to utilize TDM, then the UE may transmit (e.g., broadcast) a message indicating that the UE has detected another technology and is taking the action (e.g., vacate or TDM) as configured.

At 708, the UE may perform additional features, as discussed infra.

Figure 8:
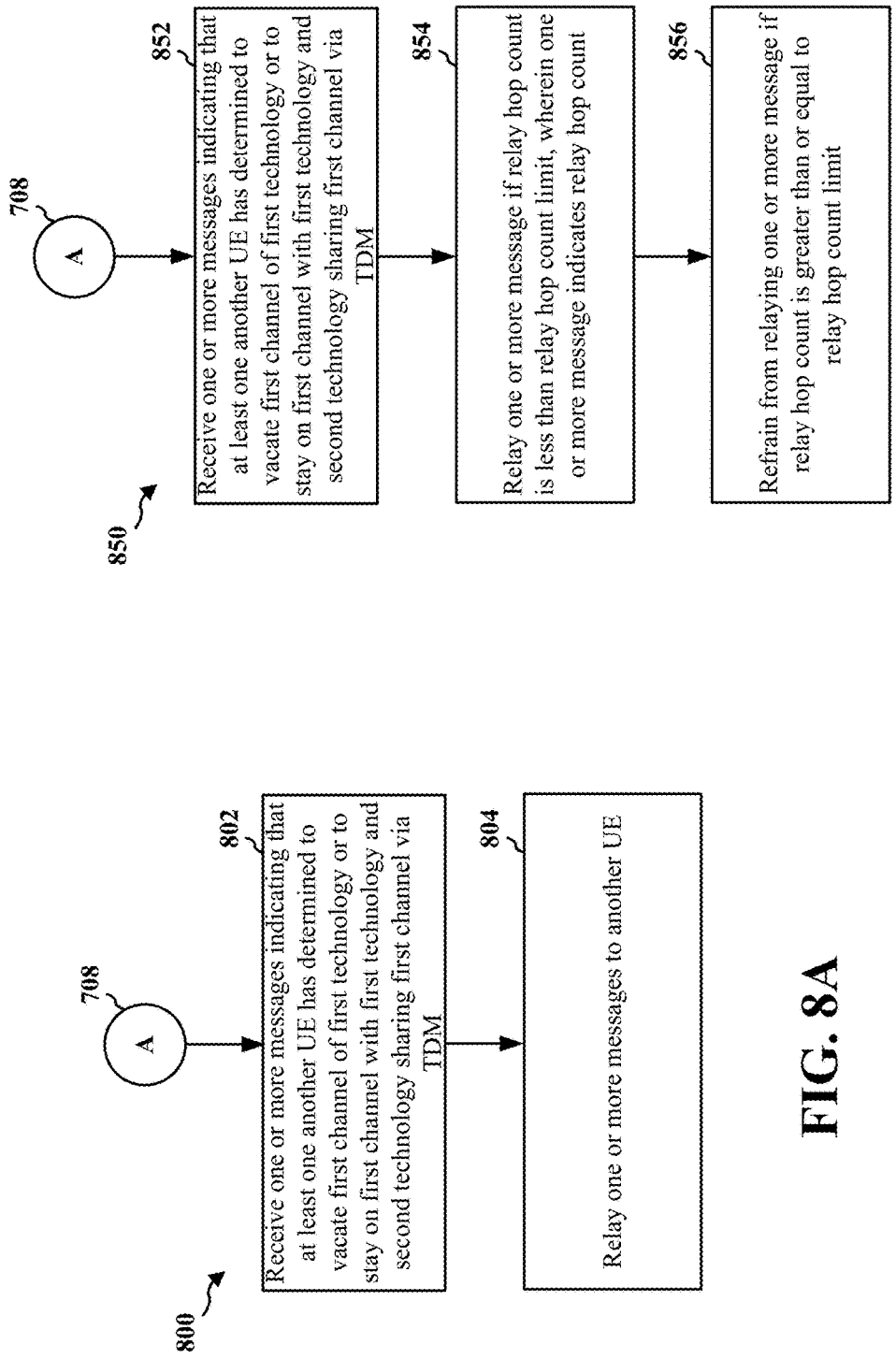
FIG. 8A is a flowchart of a method of wireless communication, expanding from the flowchart of FIG. 7.
FIG. 8B is a flowchart of a method of wireless communication, expanding from the flowchart of FIG. 7.

FIG. 8A is a flowchart 800 of a method of wireless communication, expanding from the flowchart 700 of FIG. 7. The method may be performed by a UE (e.g., the UE 532, the apparatus 1402/1402'). At 708, the UE continues from the flowchart 700 of FIG. 7. At 802, the UE receives one or more messages indicating that at least one another UE has determined to vacate the first channel of the first communication technology or to stay on the first channel with the first communication technology and the second communication technology sharing the first channel via TDM. For example, as discussed supra, a UE utilizing the first technology on a channel may receive a message from a second UE where the message indicates that the second UE utilizing the first technology on the same channel has detected another technology on the same channel and is taking a configured action (e.g., vacate or TDM). At 804, the UE relays the one or more messages to another UE. For example, as discussed supra, after receiving the message from the second UE, the UE may relay the message to another UE.

FIG. 8B is a flowchart 850 of a method of wireless communication, expanding from the flowchart 700 of FIG. 7. The method may be performed by a UE (e.g., the UE 532, the apparatus 1402/1402'). At 708, the UE continues from the flowchart 700 of FIG. 7. At 852, the UE receives one or more messages indicating that at least one another UE has determined to vacate the first channel of the first communication technology or to stay on the first channel with the first communication technology and the second communication technology sharing the first channel via TDM. For example, as discussed supra, a UE utilizing the first technology on a channel may receive a message from a second UE where the message indicates that the second UE utilizing the first technology on the same channel has detected another technology on the same channel and is taking a configured action (e.g., vacate channel or share channel via TDM). At 854, the UE relays the one or more message if a relay hop count is less than a relay hop count limit, wherein the one or more message indicates the relay hop count. For example, as discussed supra, the UE may determine to relay the message if a relay hop count is less than a relay hop count limit N, which may be a preconfigured number, where the relay hop count may be included in the message. At 856, the UE refrains from relaying the one or more message if the relay hop count is greater than or equal to the relay hop count limit. For example, as discussed supra, the UE may determine not to relay the message if a relay hop count is greater than or equal to the relay hop count limit N.

Figure 9:
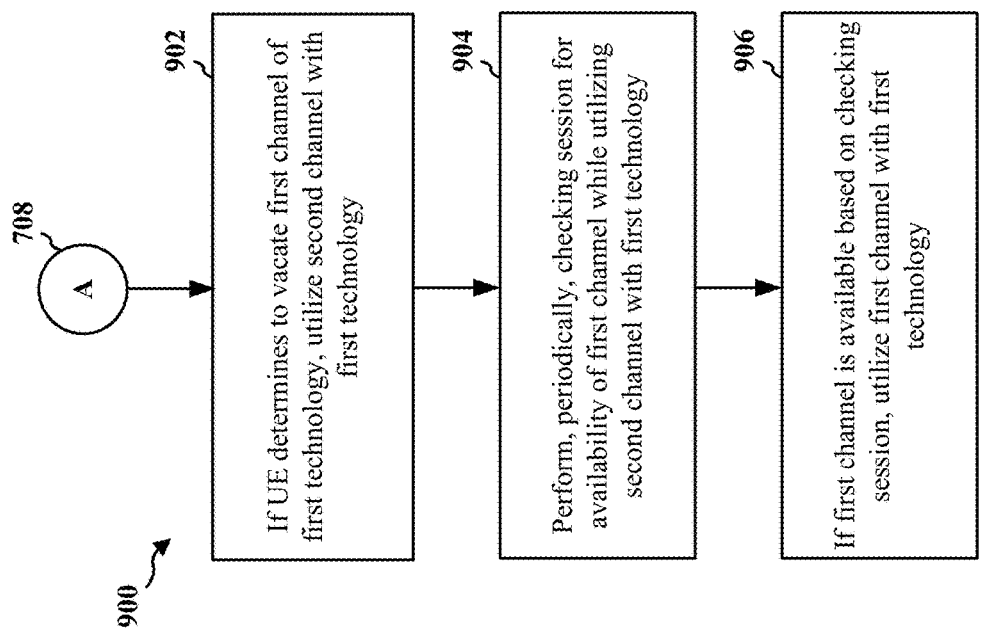
FIG. 9 is a flowchart of a method of wireless communication, expanding from the flowchart of FIG. 7.

FIG. 9 is a flowchart 900 of a method of wireless communication, expanding from the flowchart 700 of FIG. 7. The method may be performed by a UE (e.g., the UE 532, the apparatus 1402/1402'). At 708, the UE continues from the flowchart 700 of FIG. 7. At 902, if the UE determines to vacate the first channel of the first communication technology, the UE utilizes the second channel with the first communication technology. At 904, the UE may perform, periodically, a checking session for availability of the first channel while utilizing the second channel with the first communication technology. At 906, if the first channel is available based on the checking session, the UE utilizes the first channel with the first communication technology. In an aspect, each checking session may be periodically performed during a checking time duration. For example, as discussed supra, if a UE utilizing a first technology is not utilizing the first technology on a high priority channel (e.g., highest priority channel) or is utilizing the first technology on a lowest priority channel, then the UE is configured to periodically check availability of one or more higher priority channels.

In an aspect, the UE may perform the checking session by determining that the first channel is available if a number of consecutive checking sessions finding availability of the first channel exceeds a checking session threshold. For example, as discussed supra, if the UE does not detect another technology on the higher priority channel for a predefined number (e.g., Nslots_free) of the checking time slots, the UE may determine that the higher priority channel is available. In such an aspect, the UE may perform the checking session further by increasing the checking session threshold if the first channel determined to be available becomes unavailable within a predefined time period. For example, as discussed supra, the UE may increase Nslots_free (e.g., exponentially) if the UE determines the higher priority channel to be available, but later vacates the higher priority channel of the first technology within a certain time window (e.g., $T_{vacate}$) after determining the higher priority channel to be available. In such an aspect, the UE may perform the checking session further by: if the UE is a multi-mode UE capable of utilizing the first communication technology and the second communication technology, refraining from utilizing the first communication technology and the second communication technology on the first channel during the checking time duration. For example, as discussed supra, if a UE is a multi-mode UE capable of utilizing two or more technologies for transmission, the multi-mode UE may be configured not to utilize any technology for communication on the higher priority channel being checked for availability during the checking time slots.

In addition, LTE V2V communication may provide more reliable performance than IEEE 802.11p based V2V communication at least because the LTE V2V communication provides transmission synchronization, frequency-division modulation (FDM), and a coding gain. Sensing for available resources in a time domain and a frequency domain with semi-persistent transmissions may lead to more reliable performance for LTE V2V transmission. In particular, the device may determine which time frame (e.g., subframe) and which frequency band are occupied by another device's transmission and thus are unavailable (e.g., busy), and may determine which time frame and which frequency are idle and thus are available. Although the following discussion refers to LTE V2V communication, it is noted that the LTE V2V communication is similar to the LTE D2D communication, and thus the following discussion may also apply to LTE D2D communication.

V2V communication based on LTE (LTE V2V communication) may coexist with short range communication (e.g., DSRC based on IEEE 802.11p) in an unlicensed spectrum. The coexistence of the LTE V2V communication with the short range communication in the unlicensed spectrum may be similar to coexistence of LTE in the unlicensed spectrum with Wifi, for example, via license assisted access (LAA). For reliable coexistence of short range communication and LTE V2V (e.g., by eliminating or minimizing a collision due to presence of two means of communication on a same channel), the following criteria should be considered. The coexistence of the LTE V2V communication with the short range communication should place higher priority on the short range communication over the LTE V2V communication, and should not have an impact on the specification for the short range communication (e.g., by minimizing an impact on the short range communication protocol). The coexistence should be a long term coexistence scheme (e.g., more than a TTI-level coexistence or message-by-message level coexistence). The coexistence of LTE V2V and DSRC should also take into consideration different cases involving UEs that are able to perform both short range communication and LTE V2V communication and UEs that are able to perform either short range communication or LTE V2V communication. The coexistence should take into consideration multiple communication channels and LTE V2V UEs that may have multiple transmit and receive chains. Some UEs may not have transmit and receive chains for all channels. The coexistence should minimize changes to the current LTE V2V configuration. In addition, the short range communication and LTE V2V communication should be able to provide coverage for many devices. Thus, the coexistence approach should allow maximizing the number of vehicles/devices that can detect each other. Therefore, a coexistence approach for LTE V2V communication with short range communication which takes into consideration the above criteria is desired.

According to an aspect of the disclosure, a UE (e.g., UE 512) may determine whether short range communication (e.g., DSRC) is being performed on a particular channel in the unlicensed spectrum and may refrain from performing cellular D2D communication (e.g., LTE V2V communication) on the channel in the unlicensed spectrum when the channel occupied by short range communication. The UE may initially determine the priority level of each channel of multiple channels in the unlicensed spectrum. For LTE V2V communication, each channel of the multiple channels may be assigned a respective priority level (e.g., from a system level perspective). The UE may be configured to perform LTE V2V communication on a channel with a higher priority level rather than on a channel with a lower priority level. The eNB may indicate the priority level associated with each channel of the multiple channels (e.g., by communicating messages including priority information to the UEs), and/or the priority level of each channel of the multiple channels may be preconfigured for the UEs.

The priority levels for the channels in the unlicensed spectrum may be determined based on a region (e.g., assigned by an operator using the channels in the region) and/or may be determined randomly. Alternatively, the priority levels may be determined by UEs. For example, each UE may assign a higher priority level to a channel that is less occupied by short range communication. A UE may determine a level of short range communication on a particular channel according to a past communication history involving the particular channel, and may assign a priority level based on the level of short range communication. In one example, the UE may assign a higher priority level to a channel that has been less frequently occupied by short range communication than another channel according to the past communication history. For example, if the UE determines based on the past communication history that channel 1 was occupied by short range communication 10% of the time and channel 2 was occupied by short range communication 50% of the time, then the UE may assign a higher priority level to channel 1 than to channel 2 because channel 1 has been less frequently occupied by the short range communication than channel 2.

The UE may sense a highest priority channel (a channel with the highest priority level) of the multiple channels in the unlicensed spectrum to detect whether short range communication exists on the highest priority channel. For example, the UE may sense the highest priority channel by detecting a preamble in data received on the highest priority channel or by detecting an energy level on the highest priority channel, as described infra, to detect whether short range communication exists on the highest priority channel. The UE may be configured to sense the highest priority channel before each transmission, to detect the presence of the short range communication on the highest priority channel. The period for sensing the channel by the UE may be a function of a maximum sensing period for a short range communication and/or other short range communication parameters. The maximum sensing period may be used to detect the short range communication in order to ensure that there is no short range communication transmitter in a local area (e.g., area surrounding the UE). If the UE determines that no short range communication transmitter is present in the local area, then the UE may use the highest priority channel to transmit a LTE V2V communication. LTE V2V UEs (UEs capable of LTE V2V communication) in a local area may be able to sense that a channel is not occupied (e.g., not occupied by the short range communication), and then may transmit LTE V2V communication on the unoccupied channel. Such channel sensing may ensure that LTE V2V UEs in a local area are able to transmit and receive on the same channel, and may be useful for LTE V2V communication between UEs with a limited number of transmit and receive chains. In an aspect, if there are two or more channels with the highest priority level, then the UE may detect whether each of the channels with the highest priority level is occupied by the short range communication and may perform a LTE V2V communication on a channel with the highest priority level that is not occupied by the short range communication.

In an aspect, the UE may detect short range communication on a channel by detecting a preamble in data received on the channel and/or detecting energy on the channel. In particular, if the UE detects a preamble that indicates short range communication, the UE may determine the presence of short range communication on the channel. For example, the preamble may be at least one of a short training field, a long training field, or a reference signal portion. If the UE finds such a preamble, the UE may also determine that another UE transmitting short range communication is nearby. If the UE detects a high energy (e.g., an energy greater than an energy threshold) on the channel, then the UE may determine with a high likelihood that short range communication exists on the channel. If the UE detects a high energy on the channel and is not able to decode a V2V communication signal on the channel, the UE may determine with a higher likelihood that short range communication exists on the channel.

In an aspect, if the UE detects presence of short range communication on the highest priority channel when sensing on the highest priority channel, the UE may determine to perform short range wireless communication on the highest priority channel if the UE is capable of short range wireless communication. For example, the UE's short range communication on the highest priority channel that is occupied by a second short range communication may not cause collision because the UE's short range communication is the same type of communication as the second short range communication present in the highest priority channel. In an aspect, if the UE detects the presence of short range communication on the highest priority channel when sensing on the highest priority channel, then the UE may determine whether other channels are available for LTE V2V communication (e.g., if the UE is attempting to perform LTE V2V communication). If no other channels are available for LTE V2V communication, the UE may refrain from performing LTE V2V communication.

If other channels are available for LTE V2V communication and not occupied by short range communication, the UE may perform LTE V2V communication using one of the other channels available for LTE V2V communication. In particular, to perform LTE V2V communication, the UE may utilize a channel (of the other channels) with the highest priority level among the other channels available for LTE V2V communication (e.g., and not occupied by short range communication). Thus, in one example, from the other channels, the UE may select a channel with the highest priority level of the other channels that are available for LTE V2V communication and are not occupied by short range communication, and perform LTE V2V communication using the selected channel. For example, if the highest priority channel is occupied by short range communication and a second highest priority channel with the second highest priority level is available for LTE V2V communication, the UE may shift LTE V2V communication usage from the highest priority channel to the second highest priority channel. In an aspect, UEs within the same local area (e.g., same cell area) may shift LTE V2V communication usage to the second highest priority channel if the highest priority channel is occupied by short range communication. All LTE V2V UEs within the same local area may be synchronized such that all LTE V2V UEs may be capable of determining whether a certain channel is occupied by short range communication. For example, if channel 1 having the highest priority level is occupied by short range communication, all the LTE V2V UEs may utilize channel 2 having the next highest priority level to perform LTE V2V communication, provided that channel 2 is not occupied by short range communication.

If all of the UEs within the same local area shift the LTE V2V communication usage to a new channel (e.g., the second highest priority channel), then the UE may assume that information such as the interference pattern, semi-persistent scheduling (SPS) characteristics, and scheduling assignment (SA) decoding information will be carried over from a prior channel (e.g., the highest priority channel) to the new channel (e.g., the second highest priority channel). When the UE shifts to a new channel (e.g., the second highest priority channel), the UE may use such information in the new channel. The UE may additionally consider a new interference pattern observed in the new channel during LTE V2V communication on the new channel.

In a case where the UE detects the presence of short range communication on the highest priority channel and other channels are available for LTE V2V communication, if the UE in addition has short range communication capability, then the UE may perform short range communication on the highest priority channel, in addition to performing LTE V2V communication on another channel (e.g., the second highest priority channel) available for LTE V2V communication (e.g., in the unlicensed spectrum). As such, the UE may perform both the short range communication and the LTE V2V communication at the same time. The UE may consider any RF limitations on the highest priority channel before performing short range communication on the highest priority channel. If the UE detects the presence of short range communication on the highest priority channel and no other channels are available for LTE V2V communication (e.g., e.g., in the unlicensed spectrum), then the UE may not perform LTE V2V communication. If the UE does not have short range communication capability, the UE may perform the LTE V2V on a channel available for LTE V2V communication, without performing short range communication.

If the UE does not detect the presence of short range communication on the highest priority channel, the UE (and other UEs in the local area) may utilize the highest priority channel for LTE V2V communication. If the UE does not detect the presence of short range communication on the highest priority channel, the UE may still attempt to detect the presence of short range communication on another channel. Thus, if the UE does not detect presence of short range communication on the highest priority channel and the UE has short range communication capability (e.g., short range communication modem), the UE with the short range communication capability may search for channels occupied by short range communication (e.g., and/or for channels available for short range communication) in channels other than the highest priority level channel. If the UE does not detect presence of short range communication on the highest priority channel and finds a channel occupied by short range communication, the UE may perform short range communication on the channel occupied by the short range communication (e.g., DSRC-occupied channel) and may perform LTE V2V communication on the highest priority channel. The UE may perform short range communication on the channel already occupied by short range communication such that the UE may not occupy an additional channel with the UE's short range communication. If the UE does not detect presence of short range communication on any of the channels, the UE may perform LTE V2V communication on the highest priority channel and may perform short range communication on a channel that is not occupied by LTE V2V communication. For example, if the UE does not detect presence of short range communication on any of the channels, the UE may perform LTE V2V communication on the highest priority channel and the UE may perform short range communication on a channel with a highest priority among channels that are not occupied by LTE V2V communication.

The UE (and other UEs in the local area) may consider shifting LTE V2V communication back to a higher priority channel. For example, after the UE shifts LTE V2V communication by the UE from the highest priority channel to a lower priority channel (e.g., due to presence of short range communication on the highest priority channel), the UE may consider shifting LTE V2V communication back to the highest priority channel based on changed conditions on the channels. For example, the conditions may change such that the highest priority channel may no longer be occupied by the short range communication. Before shifting LTE V2V communication back to a higher priority channel, the UE checks for changed conditions by sensing whether the higher priority channel is occupied by short range communication or not. A channel occupied by short range communication may be occupied by short range communication from a UE without LTE V2V capability and/or by short range communication from a UE with LTE V2V capability.

According to an aspect of the disclosure, the UE may distinguish between short range communication from another UE without LTE V2V capability and short range communication from another UE with LTE V2V capability. In order to determine whether the channel is occupied by short range communication from a UE without LTE V2V capability or from a UE with LTE V2V capability, the UE may periodically employ a silence period during which a UE with LTE V2V capability does not transmit short range communication. The length of the silence period may be a function of short range communication parameters including maximum length of short range transmission and a maximum sensing period. LTE V2V UEs may sense the higher priority channel during the silence period and check whether short range communication from a UE without LTE V2V capability exists on the higher priority channel. Because a UE with LTE V2V capability does not transmit short range communication during the silence period, the UE may determine that some other UE without LTE V2V capability is transmitting short range communication during the silence period if the UE senses presence of a short range communication during the silence period.

If the UE that has LTE V2V capability determines that no UE without LTE V2V capability transmits on the higher priority channel, the UE may perform the LTE V2V communication on the higher priority channel. For example, if the UE determines that no UE without LTE V2V capability transmits on the higher priority channel, the UE may assume that the higher priority channel is not occupied by the short range communication, and thus LTE V2V communication using the higher priority channel may be done, even if a UE with LTE V2V capability transmits a short range communication on the higher priority channel. On the other hand, for example, if the UE determines that a UE without LTE V2V capability transmits on the higher priority channel, the UE may assume that the higher priority channel is occupied by a short range communication, and thus may not perform LTE V2V communication on the higher priority channel. In one example, if the UE determines that no UE without LTE V2V capability transmits on the higher priority channel, the UE with LTE V2V capability (e.g., and other UEs with LTE V2V capability) may shift the LTE V2V communication back to the higher priority channel (e.g., and may stop transmitting short range communication on the higher priority channel).

When the UE shifts the LTE V2V communication to the higher priority channel, the UE may assume that information such as the interference pattern, SPS characteristics, and SA decoding information will be carried over from a prior channel (e.g., lower priority channel) to the higher priority channel, where the priori channel is a channel before switching to the higher priority channel. When the UE shifts to the higher priority channel, the UE may use such information (e.g., the SPS characteristics and/or SA decoding information) on the higher priority channel. The UE may additionally consider new interference pattern on the higher priority channel during LTE V2V communication on the higher priority channel.

Figure 10:
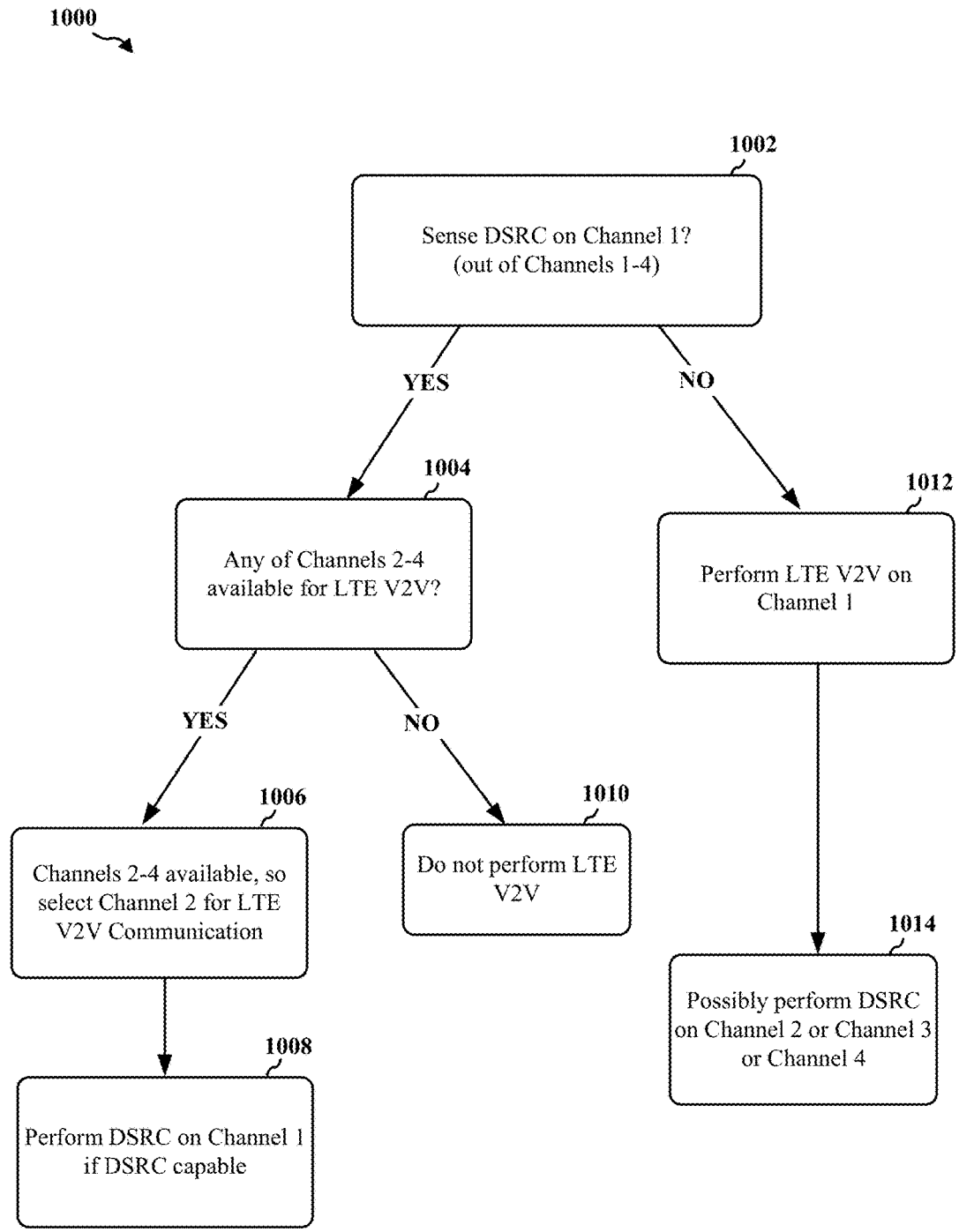
FIG. 10 is an example flow diagram illustrating an aspect of the disclosure.

FIG. 10 is an example flow diagram 1000 illustrating an aspect of the disclosure. In the example flow diagram, the UE initially determines priority levels of the channels, where Channels 1, 2, 3, and 4 have priority levels 1, 2, 3, and 4, respectively. At 1002, the UE senses whether DSRC is performed on Channel 1, the channel with the highest priority out of Channels 1-4. If the UE senses DSRC on Channel 1, the UE determines whether any of Channels 2-4 are available for LTE V2V communication. If Channels 2-4 are available for LTE V2V communication, at 1006, the UE selects Channel 2 for LTE V2V communication because Channel 2 has the highest priority level among Channels 2-4. Thus, the UE may perform LTE V2V communication using Channel 2. The UE may also perform DSRC on Channel 1, at 1008, if the UE has DSRC capability.

If the UE at 1002 senses no DSRC on Channel 1, the UE performs LTE V2V on Channel 1, at 1012. The UE may possibly perform DSRC on one or more of Channels 2-4, at 1014.

Figure 11:
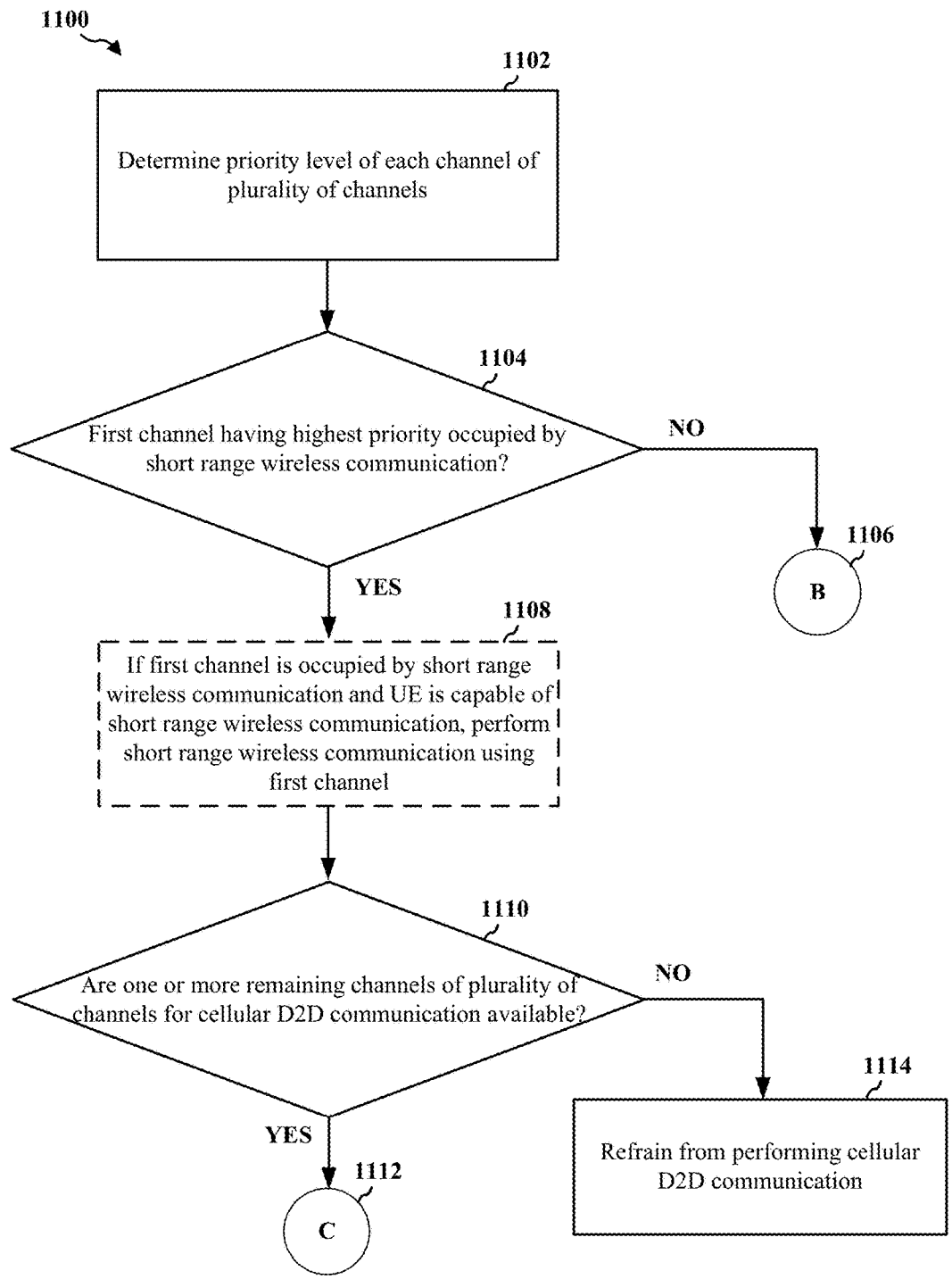
FIG. 11 is a flowchart of a method of wireless communication.

FIG. 11 is a flowchart 1100 of a method of wireless communication. The method may be performed by a UE (e.g., the UE 512, the apparatus 1402/1402'). At 1102, the UE determine a priority level of each channel of a plurality of channels. For example, as discussed supra, the UE initially determines the priority levels of multiple channels, where for LTE V2V communication, each channel of the multiple channels may be assigned with a respective priority level.

At 1104, the UE determines whether a first channel of the plurality of channels, the first channel having a highest priority level, is occupied by short range wireless communication. For example, as discussed supra, the UE may sense a highest priority channel (a channel with the highest priority level) of the multiple channels to detect whether short range communication exists on the highest priority channel. In an aspect, the UE may determine whether the first channel is occupied by short range wireless communication by sensing for short range wireless communication based on at least one of a preamble received in the first channel indicating presence of the short range wireless communication, or an energy level in the first channel exceeding a threshold. For example, as discussed supra, the UE may detect short range communication on a channel by detecting a preamble in data received on the channel and/or detecting energy (e.g., an energy greater than an energy threshold) on the channel. In an aspect, the UE may determine whether the first channel is occupied by short range wireless communication by: determining whether the short range wireless communication in the first channel is transmitted by a UE without cellular D2D capability, if the short range wireless communication in the first channel is transmitted by a UE without cellular D2D capability, determining that the first channel is occupied by short range wireless communication, and if the short range wireless communication in the first channel is transmitted by a UE with cellular D2D capability and is not transmitted by a UE without cellular D2D capability, determining that the first channel is not occupied by short range wireless communication. For example, as discussed supra, if the UE determines that no UE without LTE V2V capability transmits on the higher priority channel, the UE may assume that the higher priority channel is not occupied by the short range communication, and thus may allow LTE V2V communication on the higher priority channel, even if a UE with LTE V2V capability transmits a short range communication on the higher priority channel. On the other hand, for example, as discussed supra, if the UE determines that a UE without LTE V2V capability transmits on the higher priority channel, the UE may assume that the higher priority channel is occupied by the short range communication, and thus may not allow LTE V2V communication on the higher priority channel.

In an aspect, the UE may determine whether the short range wireless communication in the first channel is transmitted by a UE without cellular D2D capability by determining whether a UE without cellular D2D capability transmits short range wireless communication in the first channel during a silence period, where no UE with cellular D2D capability is configured to perform short range wireless communication in the first channel during the silence period, where one or more UEs including the UE may be configured to perform cellular D2D communication in the first channel if a UE without cellular D2D capability during a silence period does not transmit short range wireless communication in the first channel. For example, as discussed supra, in order to determine whether the channel is occupied by short range communication from a UE without LTE V2V capability or from a UE with LTE V2V capability, the UE may periodically employ a silence period during which a UE with LTE V2V capability does not transmit short range communication. For example, as discussed supra, if the UE determines that no UE without LTE V2V capability transmits on the higher priority channel (e.g., during the silence period), UEs with LTE V2V capability may shift the LTE V2V communication back to the higher priority channel to perform the LTE V2V communication in the higher priority channel. In such an aspect, the cellular D2D communication may be performed in the first channel based on at least one of a interference pattern, SPS characteristics, or SA decoding information carried from previous use of a previous channel. For example, as discussed supra, when the UE shifts the LTE V2V communication to the higher priority channel, the UE may assume that information such as the interference pattern, SPS characteristics, and SA decoding information will be carried over from a previous channel (e.g., lower priority channel) to the higher priority channel, and may use this information (e.g., the SPS characteristics and/or SA decoding information) on the higher priority channel.

If the first channel is not occupied by the short range wireless communication, the UE may perform features described infra at 1106. On the other hand, in an aspect, if the first channel is occupied by the short range wireless communication and the UE is capable of short range wireless communication, at 1108, the UE may perform short range wireless communication using the first channel. For example, as discussed supra, if the UE detects presence of short range communication on the highest priority channel when sensing on the highest priority channel, the UE may determine to perform short range wireless communication on the highest priority channel if the UE is capable of short range wireless communication. If the first channel is occupied by the short range wireless communication, at 1110, the UE determines availability of one or more remaining channels of the plurality of channels for cellular D2D communication, where the one or more remaining channels are different from the first channel. For example, as discussed supra, if the UE detects presence of short range communication on the highest priority channel when sensing on the highest priority channel, then the UE may determine whether other channels are available for LTE V2V communication. If the UE determines at least one of the one or more remaining channels is available for cellular D2D communication, the UE may perform features as described infra, at 1112. If none of the one or more remaining channels is available for cellular D2D communication, at 1114, the UE refrains from performing cellular D2D communication. For example, as discussed supra, if no other channels are available for LTE V2V communication, the UE may refrain from performing LTE V2V communication.

In an aspect, the cellular D2D communication may be cellular V2V communication. For example, as discussed supra, LTE V2V communication may be used for cellular D2D communication. In an aspect, the short range wireless communication may be a DSRC. In an aspect, the short range wireless communication may be based on IEEE 802.11p. For example, as discussed supra, the DSRC provides a short-range wireless communication capability, typically based on IEEE 802.11p that is similar to Wifi. In an aspect, the priority level of each channel of the plurality of channels is indicated by a base station or is preconfigured in the UE. For example, as discussed supra, the eNB may indicate the priority levels for the channels (e.g., by communicating messages including priority information to the UEs), and/or the priority levels may be preconfigured for the UEs.

Figure 12:
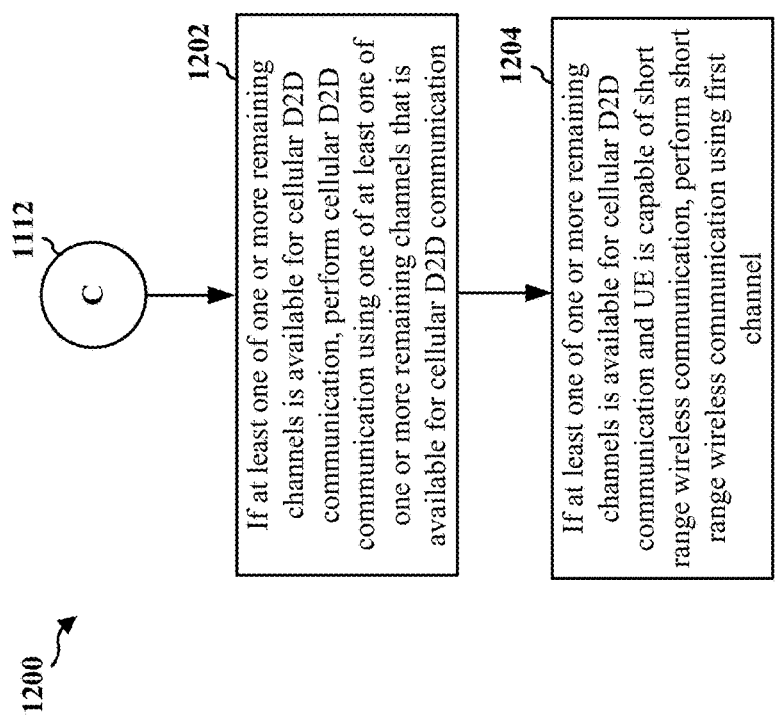
FIG. 12 is a flowchart of a method of wireless communication, expanding from the flowchart of FIG. 11.

FIG. 12 is a flowchart 1200 of a method of wireless communication, expanding from the flowchart 1100 of FIG. 11. The method may be performed by a UE (e.g., the UE 512, the apparatus 1402/1402'). The flowchart 1200 continues from 1112 in the flowchart 1100 of FIG. 11 if the UE determines at least one of the one or more remaining channels is available for cellular D2D communication. At 1202, if at least one of the one or more remaining channels is available for the cellular D2D communication, the UE performs the cellular D2D communication using one of the at least one of the one or more remaining channels that is available for the cellular D2D communication. In an aspect, a priority level of the one of the at least one of the one or more remaining channels is the highest among priority levels of the one or more remaining channels. For example, as discussed supra, if other channels are available for LTE V2V communication (e.g., and not occupied by short range communication), the UE may perform LTE V2V communication using one of the channels available for LTE V2V communication. For example, as discussed supra, to perform LTE V2V communication, the UE may utilize a channel (of the other channels) with the highest priority level among the other channels available for LTE V2V communication (e.g., and not occupied by short range communication). In an aspect, the UE may perform the cellular D2D communication using one of the at least one of the one or more remaining channels that is available for the cellular D2D communication by performing the cellular D2D communication using the one of the at least one of the one or more remaining channels based on at least one of a interference pattern, SPS characteristics, or SA decoding information from previous use of the first channel. For example, as discussed supra, if all of the UEs within the same local area shift the LTE V2V communication usage to a new channel (e.g., the second highest priority channel), then the UE may assume that information such as the interference pattern, SPS characteristics, and SA decoding information will be carried over from a prior channel (e.g., the highest priority channel) to the new channel (e.g., the second highest priority channel). In an aspect, the cellular D2D communication using one of the at least one of the one or more remaining channels that is available for the cellular D2D communication may be performed when the UE is not capable of short range wireless communication. For example, as discussed supra, if the UE does not have short range communication capability, the UE may perform the LTE V2V on a channel available for LTE V2V communication, without performing short range communication. In an aspect, the UE may perform the cellular D2D communication using one of the at least one of the one or more remaining channels that is available for the cellular D2D communication by performing the cellular D2D communication using a second channel with a highest priority level of the at least one of the one or more remaining channels that is available for the cellular D2D communication. For example, as discussed supra, to perform LTE V2V communication, the UE may utilize a channel with the highest priority level among the channels available for LTE V2V communication.

At 1204, if the at least one of the one or more remaining channels is available for cellular D2D communication and the UE is capable of short range wireless communication, the UE performs short range wireless communication using the first channel. For example, as discussed supra, in a case where the UE detects presence of short range communication on the highest priority channel and other channels are available for LTE V2V communication, if the UE in addition has short range communication capability, then the UE continues to perform short range communication on the highest priority channel.

Figure 13:
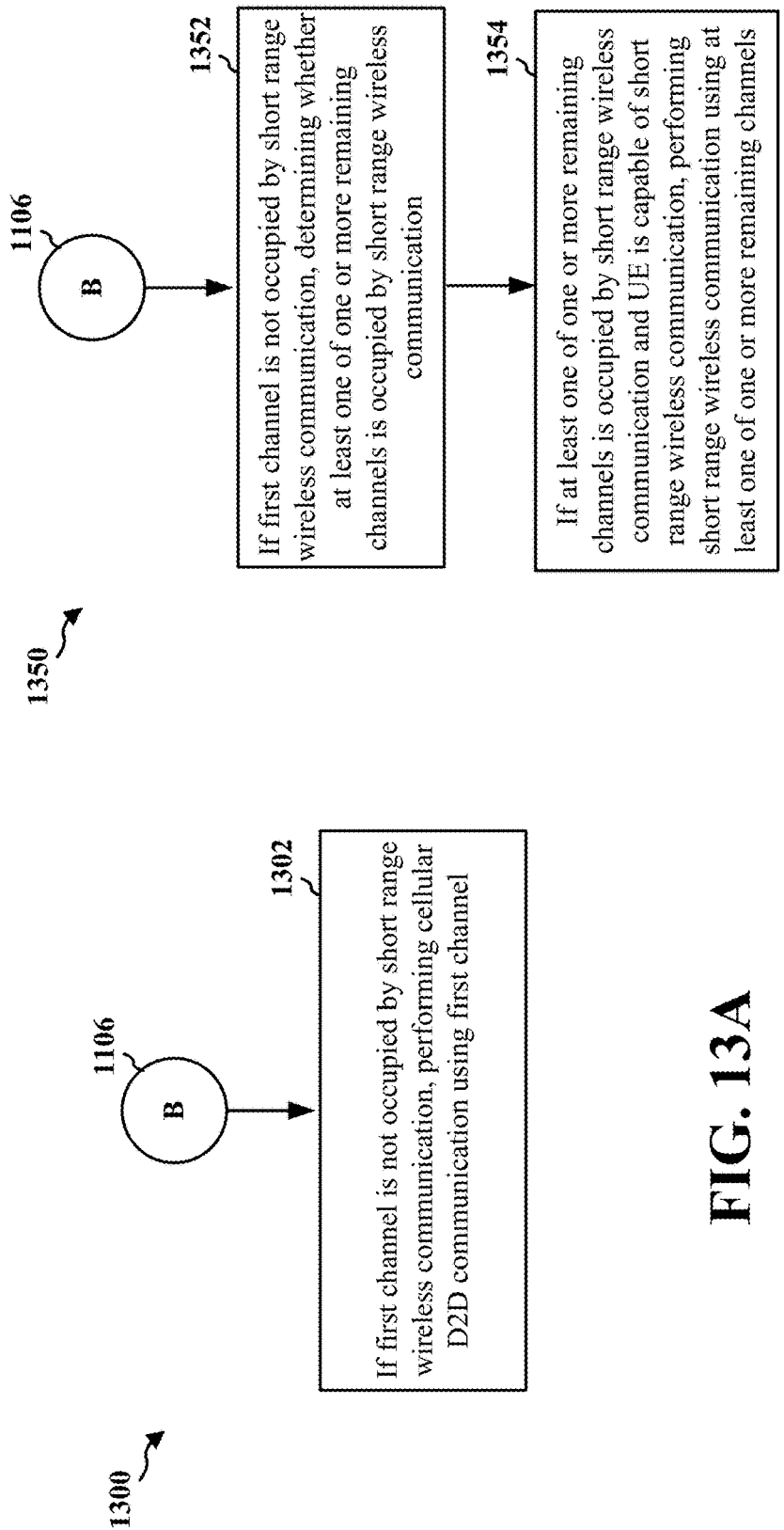
FIG. 13A is a flowchart of a method of wireless communication, expanding from the flowchart of FIG. 11.
FIG. 13B is a flowchart of a method of wireless communication, expanding from the flowchart of FIG. 11.

FIG. 13A is a flowchart 1300 of a method of wireless communication, expanding from the flowchart 1100 of FIG. 11. The method may be performed by a UE (e.g., the UE 512, the apparatus 1402/1402'). The flowchart 1300 continues from 1106 in the flowchart 1100 of FIG. 11 if the first channel is not occupied by the short range wireless communication. If the first channel is not occupied by the short range wireless communication, at 1302, the UE performs cellular D2D communication using the first channel. For example, as discussed supra, if the UE does not detect presence of short range communication on the highest priority channel, the UE (and other UEs in the local area) may utilize the highest priority channel for LTE V2V communication.

FIG. 13B is a flowchart 1350 of a method of wireless communication, expanding from the flowchart 1100 of FIG. 11. The method may be performed by a UE (e.g., the UE 512, the apparatus 1402/1402'). The flowchart 1300 continues from 1106 in the flowchart 1100 of FIG. 11 if the first channel is not occupied by the short range wireless communication. If the first channel is not occupied by the short range wireless communication, at 1352, the UE determines whether at least one of the one or more remaining channels is occupied by short range wireless communication. For example, as discussed supra, if the UE does not detect presence of short range communication on the highest priority channel, the UE with short range communication capability (e.g., short range communication modem) may search for channels occupied by short range communication (e.g., and/or for channels available for short range communication) in channels other than the highest priority level channel. If at least one of the one or more remaining channels is occupied by short range wireless communication and the UE is capable of short range wireless communication, at 1354, the UE performs short range wireless communication using the at least one of the one or more remaining channels. For example, as discussed supra, if the UE finds a channel occupied by short range communication, the UE may perform short range communication in the channel occupied by the short range communication (e.g., DSRC-occupied channel) (e.g., and may perform LTE V2V communication on the highest priority channel). In an aspect, determining (e.g., by the UE) whether at least one of the one or more remaining channels is occupied by short range wireless communication may be performed if the UE has short range wireless communication capability. For example, as discussed supra, if the UE does not detect presence of short range communication on the highest priority channel and the UE has short range communication capability, the UE with the short range communication capability may search for channels occupied by short range communication (e.g., and/or for channels available for short range communication) in channels other than the highest priority level channel.

Figure 14:
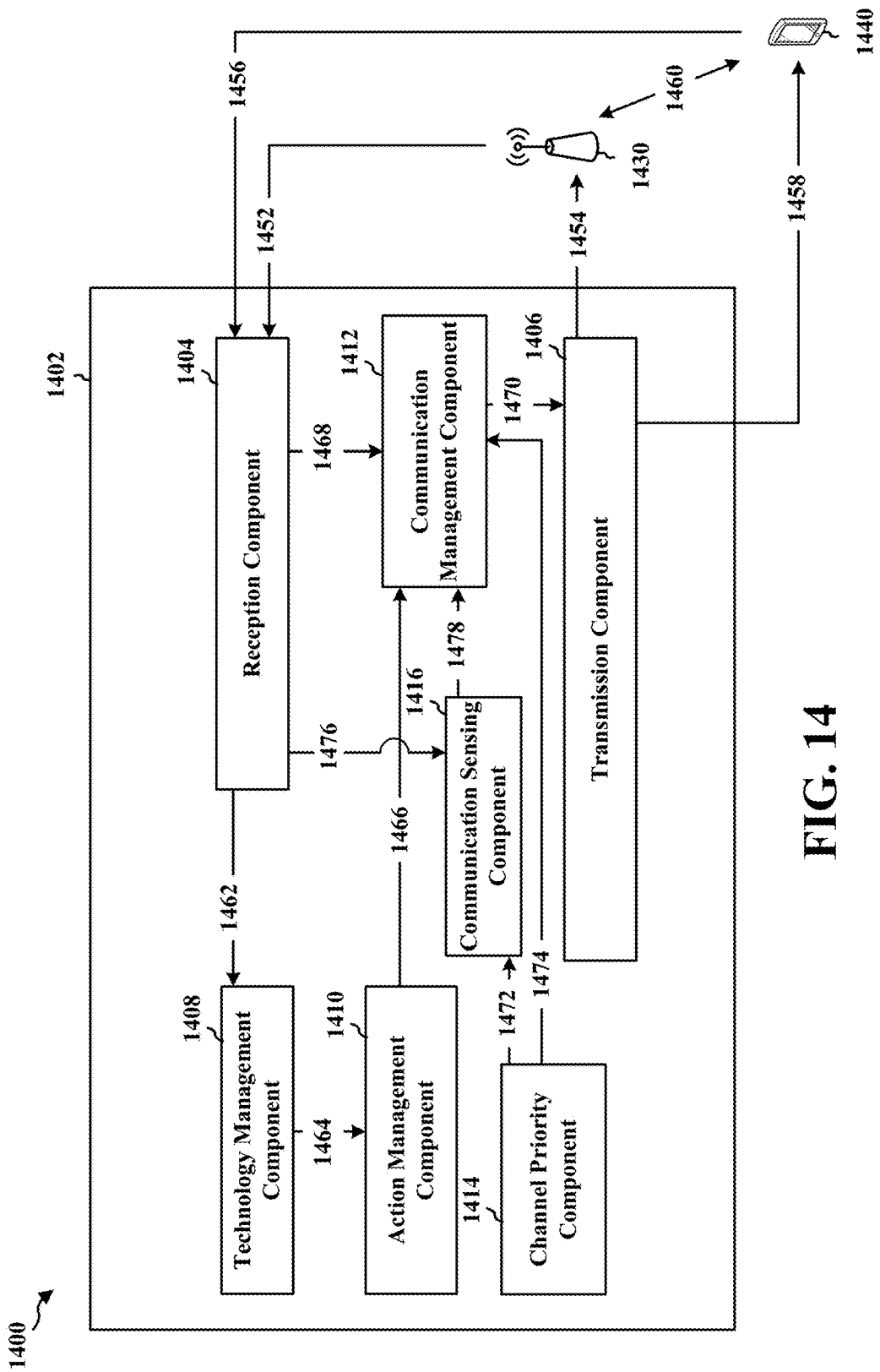
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. The apparatus may be a UE. The apparatus includes a reception component 1404, a transmission component 1406, a technology management component 1408, an action management component 1410, a communication management component 1412, a channel priority component 1414, and a communication sensing component 1416. The apparatus may be configured to communicate with a base station 1430 via the reception component 1404 and the transmission component 1406, at 1452 and 1454. The apparatus may be configured to communicate with a second UE 1440 via the reception component 1404 and the transmission component 1406, at 1456 and 1458. The second UE 1440 may be configured to communicate with the base station 1430 at 1460.

According to one aspect, the technology management component 1408 detects whether a second communication technology different from a first communication technology utilized by the UE is active on a first channel. The technology management component 1408 may perform such detection via the reception component 1404 at 1462, and may forward the results of the detection to the action management component 1410, at 1464. In an aspect, the technology management component 1408 may determine whether the second communication technology is active on the first channel by monitoring for one or more messages indicating that at least one another UE has determined to vacate the first channel of the first communication technology or to stay on the first channel with the first communication technology and the second communication technology sharing the first channel via TDM, where the detecting whether the second communication technology is active on the first channel is based on the one or more messages. In such an aspect, the technology management component 1408 may detect whether the second communication technology is active on the first channel further by: if one or more messages indicating that at least one another UE has determined to vacate the first channel of the first communication technology are received, determining that the second communication technology is detected on the first channel, and if no message indicating that another UE has determined to vacate the first channel of the first communication technology is received, determining that the second communication technology is not detected on the first channel.

In an aspect, the technology management component 1408 may detect whether the second communication technology is active on the first channel by receiving a sequence indicating the second communication technology. In an aspect, the technology management component 1408 may detect whether the second communication technology is active on the first channel by receiving a sequence unique to the second communication technology.

In an aspect, the technology management component 1408 may detect whether the second communication technology is active on the first channel by: identifying, on the first channel, one or more resources whose energy levels are greater than an energy threshold, determining that the second communication technology is detected on the first channel if a fraction based on an amount of decodable energy of the one or more resources on the first channel and an overall energy of the one or more resources is less than an fraction threshold, and determining that the second communication technology is not detected on the first channel if the fraction based on the amount of the decodable energy of the one or more resources on the first channel and the overall energy of the one or more resources is greater than the fraction threshold.

The action management component 1410 performs, based on the detection, an action associated with assigning the first communication technology to at least one of the first channel or a second channel. In an aspect, the action management component 1410 may forward information about the action to the communication management component 1412 at 1466, such that the communication management component 1412 may manage communication via the reception component 1404 at 1468 and the transmission component 1406 at 1470 accordingly. In an aspect, the action management component 1410 may perform the action by determining, based on the detection, whether to stay on a first channel with the first communication technology, or to vacate the first channel of the first communication technology, or to stay on the first channel with the first communication technology and the second communication technology sharing the first channel via TDM, where the action is performed based on the determination.

In an aspect, the determination may be based on configuration information provided to the UE, the configuration information including at least one of: priority levels of the first channel and second channel for the first communication technology, one or more geographical areas in which the first channel is allowed to be used, one or more geographical areas in which the second channel is allowed to be used, or an action to be performed upon detection of the second communication technology on each of the first and second channels. In such an aspect, the action may be based on a type of the second communication technology. In such an aspect, the configuration information may be based on at least one of pre-configuration within the UE or dynamic configuration via a received configuration message. In such an aspect, the pre-configuration may be performed via at least one of the UE or a UICC, and the dynamic configuration is performed based on at least one of RRC signaling from a base station, signaling from an ITS sever, or signaling from an operator-controlled server.

In an aspect, if the action management component 1410 determines to vacate the first channel of the first communication technology or to stay on the first channel with the first communication technology and the second communication technology sharing the first channel via TDM, the communication management component 1412 may transmit a message to one or more other UEs, the message indicating the determination by the UE, via the transmission component 1406, at 1470.

In an aspect, the technology management component 1408 receives, via the reception component 1404 at 1462 (e.g., from the second UE 1440 at 1456), one or more messages indicating that at least one another UE (e.g., second UE 1440) has determined to vacate the first channel of the first communication technology or to stay on the first channel with the first communication technology and the second communication technology sharing the first channel via TDM. The communication management component 1412 may relay the one or more messages to another UE via the transmission component 1406 at 1470.

In an aspect, the technology management component 1408 receives, via the reception component 1404 at 1462 (e.g., from the second UE 1440 at 1456), one or more messages indicating that at least one another UE (e.g., second UE 1440) has determined to vacate the first channel of the first communication technology or to stay on the first channel with the first communication technology and the second communication technology sharing the first channel via TDM. The communication management component 1412 may relay the one or more message via the transmission component 1406 at 1470 if a relay hop count is less than a relay hop count limit, where the one or more message indicates the relay hop count. The communication management component 1412 refrains from relaying the one or more message if the relay hop count is greater than or equal to the relay hop count limit.

In an aspect, if the action management component 1410 determines to vacate the first channel of the first communication technology, the communication management component 1412 utilizes the second channel with the first communication technology. The communication management component 1412 performs, periodically, a checking session for availability of the first channel while utilizing the second channel with the first communication technology. If the first channel is available based on the checking session, the communication management component 1412 utilizes the first channel with the first communication technology. In an aspect, each checking session may be periodically performed during a checking time duration.

In an aspect, the communication management component 1412 may perform the checking session by determining that the first channel is available if a number of consecutive checking sessions finding availability of the first channel exceeds a checking session threshold. In such an aspect, the communication management component 1412 may perform the checking session further by increasing the checking session threshold if the first channel determined to be available becomes unavailable within a predefined time period. In such an aspect, the communication management component 1412 may perform the checking session further by: if the UE is a multi-mode UE capable of utilizing the first communication technology and the second communication technology, refraining from utilizing the first communication technology and the second communication technology on the first channel during the checking time duration.

According to another aspect, the channel priority component 1414 determine a priority level of each channel of a plurality of channels. The channel priority component 1414 may forward information about the priority level to the communication sensing component 1416 at 1472 and to the communication management component 1412 at 1474. The communication sensing component 1416 determines whether a first channel of the plurality of channels, the first channel having a highest priority level, is occupied by short range wireless communication, via the reception component 1404, (e.g., at 1456 and 1476), and may forward the result of the determination to the communication management component 1412 at 1478. In an aspect, the communication sensing component 1416 may determine whether the first channel is occupied by short range wireless communication by sensing for short range wireless communication based on at least one of a preamble received in the first channel indicating presence of the short range wireless communication, or an energy level in the first channel exceeding a threshold. In an aspect, the communication sensing component 1416 may determine whether the first channel is occupied by short range wireless communication by: determining whether the short range wireless communication in the first channel is transmitted by a UE without cellular D2D capability, if the short range wireless communication in the first channel is transmitted by a UE without cellular D2D capability, determining that the first channel is occupied by short range wireless communication, and if the short range wireless communication in the first channel is transmitted by a UE with cellular D2D capability and is not transmitted by a UE without cellular D2D capability, determining that the first channel is not occupied by short range wireless communication. In an aspect, the communication sensing component 1416 determines whether the short range wireless communication in the first channel is transmitted by a UE without cellular D2D capability by determining whether a UE without cellular D2D capability transmits short range wireless communication in the first channel during a silence period, wherein no UE with cellular D2D capability is configured to perform short range wireless communication in the first channel during the silence period, where one or more UEs including the UE are configured to perform cellular D2D communication in the first channel if a UE without cellular D2D capability during a silence period does not transmit short range wireless communication in the first channel. In such an aspect, the cellular D2D communication is performed in the first channel based on at least one of a interference pattern, SPS characteristics, or SA decoding information carried from previous use of a previous channel.

If the first channel is occupied by the short range wireless communication and the UE is capable of short range wireless communication, the communication management component 1412 may perform short range wireless communication using the first channel, via the transmission component 1406 and the reception component 1404 (e.g., with another UE 1440 at 1470, 1458, 1456, and 1468). The transmission component 1406 and the reception component 1404 may be configured to communicate with a base station 1430, at 1454 and 1452. If the first channel is occupied by the short range wireless communication, the communication management component 1412 determines availability of one or more remaining channels of the plurality of channels for cellular D2D communication, wherein the one or more remaining channels are different from the first channel. If none of the one or more remaining channels is available for cellular D2D communication, at 1114, the communication management component 1412 refrains from performing cellular D2D communication.

In an aspect, the cellular D2D communication is cellular V2V communication. In an aspect, the short range wireless communication is a DSRC. In an aspect, the short range wireless communication is based on IEEE 802.11p. In an aspect, the priority level of each channel of the plurality of channels is indicated by a base station or is preconfigured in the UE.

If at least one of the one or more remaining channels is available for the cellular D2D communication, the communication management component 1412 performs the cellular D2D communication using one of the at least one of the one or more remaining channels that is available for the cellular D2D communication, via the transmission component 1406 and the reception component 1404 (e.g., at 1470, 1458, 1456, and 1468). In an aspect, the UE may perform the cellular D2D communication using one of the at least one of the one or more remaining channels that is available for the cellular D2D communication by performing the cellular D2D communication using the one of the at least one of the one or more remaining channels based on at least one of a interference pattern, SPS characteristics, or SA decoding information from previous use of the first channel. In an aspect, a priority level of the one of the at least one of the one or more remaining channels is the highest among priority levels of the one or more remaining channels. In an aspect, the cellular D2D communication using one of the at least one of the one or more remaining channels that is available for the cellular D2D communication is performed when the UE is not capable of short range wireless communication. In an aspect, the UE may perform the cellular D2D communication using one of the at least one of the one or more remaining channels that is available for the cellular D2D communication by performing the cellular D2D communication using a second channel with a highest priority level of the at least one of the one or more remaining channels that is available for the cellular D2D communication.

If the at least one of the one or more remaining channels is available for the cellular D2D communication and the UE is capable of short range wireless communication, the communication management component 1412 performs short range wireless communication using the first channel, via the transmission component 1406 and the reception component 1404 (e.g., at 1470, 1458, 1456, and 1468).

In an aspect, if the first channel is not occupied by the short range wireless communication, the communication management component 1412 performs cellular D2D communication using the first channel, via the transmission component 1406 and the reception component 1404 (e.g., at 1470, 1458, 1456, and 1468).

In an aspect, if the first channel is not occupied by the short range wireless communication, the communication sensing component 1416 determines whether at least one of the one or more remaining channels is occupied by short range wireless communication. If at least one of the one or more remaining channels is occupied by short range wireless communication and the UE is capable of short range wireless communication, the communication management component 1412 performs short range wireless communication using the at least one of the one or more remaining channels, via the transmission component 1406 and the reception component 1404 (e.g., at 1470, 1458, 1456, and 1468). In an aspect, the communication sensing component 1416 may determine whether at least one of the one or more remaining channels is occupied by short range wireless communication if the UE has short range wireless communication capability.

The apparatus may include additional components that perform each of the blocks of the algorithm in the aforementioned flowcharts of FIGS. 7-9 and 11-13. As such, each block in the aforementioned flowcharts of FIGS. 7-9 and 11-13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
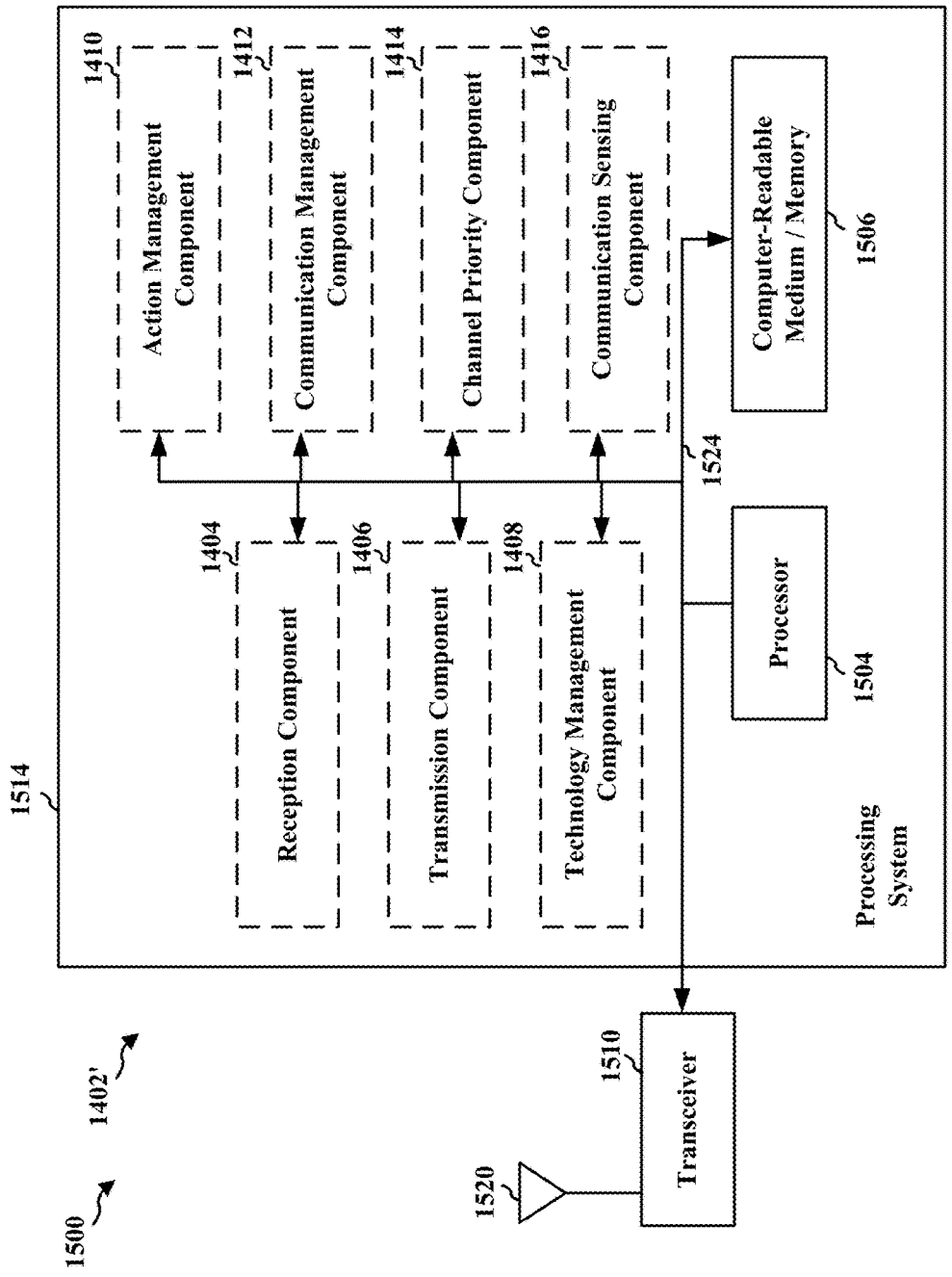
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1406, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412. The components may be software components running in the processor 1504, resident/stored in the computer readable medium/memory 1506, one or more hardware components coupled to the processor 1504, or some combination thereof. The processing system 1514 may be a component of the UE 350 and may include the memory 360 and/or at least one of the TX processor 368, the RX processor 356, and the controller/processor 359.

In one configuration, the apparatus 1402/1402' for wireless communication includes means for detecting whether a second communication technology different from a first communication technology utilized by the UE is active on a first channel, and means for performing, based on the detection, an action associated with assigning the first communication technology to at least one of the first channel or a second channel. In an aspect, the means for performing the action may be configured to: determine, based on the detection, whether to stay on a first channel with the first communication technology, or to vacate the first channel of the first communication technology, or to stay on the first channel with the first communication technology and the second communication technology sharing the first channel via TDM, wherein the action is performed based on the determination. In an aspect, the apparatus 1402/1402' may further include means for transmitting a message to one or more other UEs if the UE determines to vacate the first channel of the first communication technology or to stay on the first channel with the first communication technology and the second communication technology sharing the first channel via TDM, the message indicating the determination by the UE.

In an aspect, the means for detecting whether the second communication technology is active on the first channel is configured to: monitor for one or more messages indicating that at least one another UE has determined to vacate the first channel of the first communication technology or to stay on the first channel with the first communication technology and the second communication technology sharing the first channel via TDM, wherein the detecting whether the second communication technology is active on the first channel is based on the one or more messages. In such an aspect, the means for detecting whether the second communication technology is active on the first channel is further configured to: if one or more messages indicating that at least one another UE has determined to vacate the first channel of the first communication technology are received, determine that the second communication technology is detected on the first channel, and if no message indicating that another UE has determined to vacate the first channel of the first communication technology is received, determine that the second communication technology is not detected on the first channel.

In an aspect, the apparatus 1402/1402' may further include means for receiving one or more messages indicating that at least one another UE has determined to vacate the first channel of the first communication technology or to stay on the first channel with the first communication technology and the second communication technology sharing the first channel via TDM; and means for relaying the one or more messages to another UE. In an aspect, the apparatus 1402/1402' may further include means for receiving one or more messages indicating that at least one another UE has determined to vacate the first channel of the first communication technology or to stay on the first channel with the first communication technology and the second communication technology sharing the first channel via TDM, and means for relaying the one or more message if a relay hop count is less than a relay hop count limit, wherein the one or more message indicates the relay hop count; and means for refraining from relaying the one or more message if the relay hop count is greater than or equal to the relay hop count limit.

In an aspect, the apparatus 1402/1402' may further include means for utilizing the second channel with the first communication technology if the UE determines to vacate the first channel of the first communication technology. In such an aspect, the apparatus 1402/1402' may further include means for performing, periodically, a checking session for availability of the first channel while utilizing the second channel with the first communication technology, and means for utilizing the first channel with the first communication technology if the first channel is available based on the checking session. In such an aspect, he means for performing the checking session is configured to determine that the first channel is available if a number of consecutive checking sessions finding availability of the first channel exceeds a checking session threshold. In such an aspect, the means for performing the checking session is further configured to increase the checking session threshold if the first channel determined to be available becomes unavailable within a predefined time period. In an aspect, the means for performing the checking session is configured to: if the UE is a multi-mode UE capable of utilizing the first communication technology and the second communication technology, refrain from utilizing the first communication technology and the second communication technology on the first channel during the checking time duration.

In an aspect, the means for detecting whether the second communication technology is active on the first channel is configured to receive a sequence indicating the second communication technology. In an aspect, the means for detecting whether the second communication technology is active on the first channel is configured to receive a sequence unique to the second communication technology. In an aspect, the means for detecting whether the second communication technology is active on the first channel is configured to: identify, on the first channel, one or more resources whose energy levels are greater than an energy threshold, determine that the second communication technology is detected on the first channel if a fraction based on an amount of decodable energy of the one or more resources on the first channel and an overall energy of the one or more resources is less than an fraction threshold, and determine that the second communication technology is not detected on the first channel if the fraction based on the amount of the decodable energy of the one or more resources on the first channel and the overall energy of the one or more resources is greater than the fraction threshold.

In another configuration, the apparatus 1402/1402' for wireless communication includes means for determining a priority level of each channel of a plurality of channels, means for determining whether a first channel of the plurality of channels, the first channel having a highest priority level, is occupied by short range wireless communication, and means for determining availability of one or more remaining channels of the plurality of channels for cellular D2D communication if the first channel is occupied by the short range wireless communication, wherein the one or more remaining channels are different from the first channel. In an aspect, the apparatus 1402/1402' includes means for performing the cellular D2D communication using one of the at least one of the one or more remaining channels that is available for the cellular D2D communication if at least one of the one or more remaining channels is available for the cellular D2D communication. In such an aspect, the means for performing the cellular D2D communication using one of the at least one of the one or more remaining channels that is available for the cellular D2D communication is configured to perform the cellular D2D communication using the one of the at least one of the one or more remaining channels based on at least one of a interference pattern, SPS characteristics, or SA decoding information from previous use of the first channel. In such an aspect, the means for performing the cellular D2D communication is configured to perform the cellular D2D communication using a second channel with a highest priority level of the at least one of the one or more remaining channels that is available for the cellular D2D communication. In an aspect, the apparatus 1402/1402' includes means for performing short range wireless communication using the first channel if the at least one of the one or more remaining channels is available for the cellular D2D communication and the UE is capable of short range wireless communication.

In an aspect, the apparatus 1402/1402' includes means for refraining from performing cellular D2D communication if none of the one or more remaining channels is available for cellular D2D communication. In an aspect, the apparatus 1402/1402' includes means for performing short range wireless communication using the first channel if the first channel is occupied by the short range wireless communication and the UE is capable of short range wireless communication. In an aspect, the apparatus 1402/1402' includes means for performing cellular D2D communication using the first channel if the first channel is not occupied by the short range wireless communication. In an aspect, the apparatus 1402/1402' includes means for determining whether at least one of the one or more remaining channels is occupied by short range wireless communication, if the first channel is not occupied by the short range wireless communication, and means for performing short range wireless communication using the at least one of the one or more remaining channels, if at least one of the one or more remaining channels is occupied by short range wireless communication and the UE is capable of short range wireless communication. In such an aspect, the apparatus 1402/1402' includes means for the means for determining whether at least one of the one or more remaining channels is occupied by short range wireless communication is configured to determine whether at least one of the one or more remaining channels is occupied by short range wireless communication if the UE has short range wireless communication capability. In an aspect, the apparatus 1402/1402' includes the means for determining whether the first channel is occupied by short range wireless communication is configured to sense for short range wireless communication based on at least one of a preamble received in the first channel indicating presence of the short range wireless communication, or an energy level in the first channel exceeding a threshold. In an aspect, the apparatus 1402/1402' includes the means for determining whether the first channel is occupied by short range wireless communication is configured to: determine whether the short range wireless communication in the first channel is transmitted by a UE without cellular D2D capability, if the short range wireless communication in the first channel is transmitted by a UE without cellular D2D capability, determine that the first channel is occupied by short range wireless communication, and if the short range wireless communication in the first channel is transmitted by a UE with cellular D2D capability and is not transmitted by a UE without cellular D2D capability, determine that the first channel is not occupied by short range wireless communication. In an aspect, the apparatus 1402/1402' includes the means for determining whether the first channel is occupied by short range wireless communication that is configured to determine whether the short range wireless communication in the first channel is transmitted by a UE without cellular D2D capability is configured to: determine whether a UE without cellular D2D capability transmits short range wireless communication in the first channel during a silence period, wherein no UE with cellular D2D capability is configured to perform short range wireless communication in the first channel during the silence period, wherein one or more UEs including the UE are configured to perform cellular D2D communication in the first channel if a UE without cellular D2D capability during a silence period does not transmit short range wireless communication in the first channel.

The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
    detecting whether a second communication technology different from a first communication technology utilized by the UE is active on a first channel, wherein the detecting whether the second communication technology is active on the first channel comprises:
        monitoring the first channel for one or more messages indicating that at least one another UE has determined to vacate the first channel of the first communication technology or to stay on the first channel with the first communication technology and the second communication technology sharing the first channel via TDM,
        wherein the detecting whether the second communication technology is active on the first channel is based on the one or more messages; and
    performing, based on the detection, an action associated with assigning the first communication technology to at least one of the first channel or a second channel.

2. The method of claim 1, wherein the performing the action comprises
    determining, based on the detection, whether to stay on a first channel with the first communication technology, or to vacate the first channel of the first communication technology, or to stay on the first channel with the first communication technology and the second communication technology sharing the first channel via time division multiplex (TDM),
    wherein the action is performed based on the determination.

3. The method of claim 2, wherein the determination is based on configuration information provided to the UE, the configuration information including at least one of:
    priority levels of the first channel and second channel for the first communication technology,
    one or more geographical areas in which the first channel is allowed to be used,
    one or more geographical areas in which the second channel is allowed to be used, or
    an action to be performed upon detection of the second communication technology on each of the first and second channels.

4. The method of claim 3, where the action is based on a type of the second communication technology.

5. The method of claim 2, further comprising:
    if the UE determines to vacate the first channel of the first communication technology or to stay on the first channel with the first communication technology and the second communication technology sharing the first channel via TDM, transmitting a message to one or more other UEs, the message indicating the determination by the UE.

6. The method of claim 2, further comprising:
    if the UE determines to vacate the first channel of the first communication technology, utilizing the second channel with the first communication technology.

7. The method of claim 1, wherein the detecting whether the second communication technology is active on the first channel further comprises:
    if one or more messages indicating that at least one another UE has determined to vacate the first channel of the first communication technology are received, determining that the second communication technology is detected on the first channel; and
    if no message indicating that another UE has determined to vacate the first channel of the first communication technology is received, determining that the second communication technology is not detected on the first channel.

8. A method of wireless communication by a user equipment (UE), comprising:
    detecting whether a second communication technology different from a first communication technology utilized by the UE is active on a first channel;
    performing, based on the detection, an action associated with assigning the first communication technology to at least one of the first channel or a second channel;
    receiving one or more messages indicating that at least one another UE has determined to vacate the first channel of the first communication technology or to stay on the first channel with the first communication technology and the second communication technology sharing the first channel via TDM; and
    relaying the one or more messages to another UE.

9. A method of wireless communication by a user equipment (UE), comprising:

detecting whether a second communication technology different from a first communication technology utilized by the UE is active on a first channel;

performing, based on the detection, an action associated with assigning the first communication technology to at least one of the first channel or a second channel;

receiving one or more messages indicating that at least one another UE has determined to vacate the first channel of the first communication technology or to stay on the first channel with the first communication technology and the second communication technology sharing the first channel via TDM;

relaying the one or more message if a relay hop count is less than a relay hop count limit, wherein the one or more message indicates the relay hop count; and refraining from relaying the one or more message if the relay hop count is greater than or equal to the relay hop count limit.

10. A method of wireless communication by a user equipment (UE), comprising:

detecting whether a second communication technology different from a first communication technology utilized by the UE is active on a first channel; and performing, based on the detection, an action associated with assigning the first communication technology to at least one of the first channel or a second channel, wherein the performing the action comprises determining, based on the detection, whether to stay on a first channel with the first communication technology, or to vacate the first channel of the first communication technology, or to stay on the first channel with the first communication technology and the second communication technology sharing the first channel via time division multiplex (TDM), wherein the action is performed based on the determination;

if the UE determines to vacate the first channel of the first communication technology, utilizing the second channel with the first communication technology;

performing, periodically, a checking session for availability of the first channel while utilizing the second channel with the first communication technology; and if the first channel is available based on the checking session, utilizing the first channel with the first communication technology.

11. The method of claim 10, wherein the performing the checking session comprises:

determining that the first channel is available if a number of consecutive checking sessions finding availability of the first channel exceeds a checking session threshold.

12. The method of claim 11, wherein the performing the checking session further comprises:

increasing the checking session threshold if the first channel determined to be available becomes unavailable within a predefined time period.

13. The method of claim 10, wherein the performing the checking session comprises:

if the UE is a multi-mode UE capable of utilizing the first communication technology and the second communication technology, refraining from utilizing the first communication technology and the second communication technology on the first channel during the checking time duration.

14. A method of wireless communication by a user equipment (UE), comprising:

detecting whether a second communication technology different from a first communication technology utilized by the UE is active on a first channel, wherein the detecting whether the second communication technology is active on the first channel comprises receiving a sequence indicating the second communication technology; and performing, based on the detection, an action associated with assigning the first communication technology to at least one of the first channel or a second channel.

15. A method of wireless communication by a user equipment (UE), comprising:

detecting whether a second communication technology different from a first communication technology utilized by the UE is active on a first channel, wherein the detecting whether the second communication technology is active on the first channel comprises:

receiving a sequence unique to the second communication technology; and performing, based on the detection, an action associated with assigning the first communication technology to at least one of the first channel or a second channel.

16. A method of wireless communication by a user equipment (UE), comprising:

detecting whether a second communication technology different from a first communication technology utilized by the UE is active on a first channel, wherein the detecting whether the second communication technology is active on the first channel comprises:

identifying, on the first channel, one or more resources whose energy levels are greater than an energy threshold;

determining that the second communication technology is detected on the first channel if a fraction based on an amount of decodable energy of the one or more resources on the first channel and an overall energy of the one or more resources is less than an fraction threshold, and determining that the second communication technology is not detected on the first channel if the fraction based on the amount of the decodable energy of the one or more resources on the first channel and the overall energy of the one or more resources is greater than the fraction threshold; and performing, based on the detection, an action associated with assigning the first communication technology to at least one of the first channel or a second channel.

17. A user equipment (UE) for wireless communication, comprising:

means for detecting whether a second communication technology different from a first communication technology utilized by the UE is active on a first channel, wherein the means for detecting whether the second communication technology is active on the first channel is configured to:

monitor the first channel for one or more messages indicating that at least one another UE has determined to vacate the first channel of the first communication technology or to stay on the first channel with the first communication technology and the second communication technology sharing the first channel via TDM, wherein the means for detecting whether the second communication technology is active on the first channel is based on the one or more messages; and means for performing, based on the detection, an action associated with assigning the first communication technology to at least one of the first channel or a second channel.

18. The UE of claim 17, wherein the means for performing the action is configured to:
- determine, based on the detection, whether to stay on a first channel with the first communication technology, or to vacate the first channel of the first communication technology, or to stay on the first channel with the first communication technology and the second communication technology sharing the first channel via time division multiplex (TDM),
- wherein the action is performed based on the determination.

19. The UE of claim 18, further comprising:
- means for transmitting a message to one or more other UEs if the UE determines to vacate the first channel of the first communication technology or to stay on the first channel with the first communication technology and the second communication technology sharing the first channel via TDM, the message indicating the determination by the UE.

20. A user equipment (UE) for wireless communication, comprising:
- means for detecting whether a second communication technology different from a first communication technology utilized by the UE is active on a first channel;
- means for performing, based on the detection, an action associated with assigning the first communication technology to at least one of the first channel or a second channel;
- means for receiving one or more messages indicating that at least one another UE has determined to vacate the first channel of the first communication technology or to stay on the first channel with the first communication technology and the second communication technology sharing the first channel via TDM; and
- means for relaying the one or more messages to another UE.

21. A user equipment (UE) for wireless communication, comprising:
- means for detecting whether a second communication technology different from a first communication technology utilized by the UE is active on a first channel;
- means for performing, based on the detection, an action associated with assigning the first communication technology to at least one of the first channel or a second channel;
- means for receiving one or more messages indicating that at least one another UE has determined to vacate the first channel of the first communication technology or to stay on the first channel with the first communication technology and the second communication technology sharing the first channel via TDM;
- means for relaying the one or more message if a relay hop count is less than a relay hop count limit, wherein the one or more message indicates the relay hop count; and
- means for refraining from relaying the one or more message if the relay hop count is greater than or equal to the relay hop count limit.

22. A user equipment (UE) for wireless communication, comprising:
- means for detecting whether a second communication technology different from a first communication technology utilized by the UE is active on a first channel; and
- means for performing, based on the detection, an action associated with assigning the first communication technology to at least one of the first channel or a second channel; wherein the means for performing the action is configured to:
  - determine, based on the detection, whether to stay on a first channel with the first communication technology, or to vacate the first channel of the first communication technology, or to stay on the first channel with the first communication technology and the second communication technology sharing the first channel via time division multiplex (TDM), wherein the action is performed based on the determination;
- means for utilizing the second channel with the first communication technology if the UE determines to vacate the first channel of the first communication technology.

23. A user equipment (UE) for wireless communication, comprising:
- a memory; and
- at least one processor coupled to the memory and configured to:
  - detect whether a second communication technology different from a first communication technology utilized by the UE is active on a first channel, wherein the at least one processor is configured to:
    - monitoring the first channel for one or more messages indicating that at least one another UE has determined to vacate the first channel of the first communication technology or to stay on the first channel with the first communication technology and the second communication technology sharing the first channel via TDM,
    - wherein the at least one processor is configured to detect whether the second communication technology is active on the first channel based on the one or more messages; and
  - perform, based on the detection, an action associated with assigning the first communication technology to at least one of the first channel or a second channel.

24. The UE of claim 23, wherein the at least one processor configured to perform the action is configured to:
- determine, based on the detection, whether to stay on a first channel with the first communication technology, or to vacate the first channel of the first communication technology, or to stay on the first channel with the first communication technology and the second communication technology sharing the first channel via time division multiplex (TDM),
- wherein the action is performed based on the determination.

25. The UE of claim 24, wherein the at least one processor is further configured to:
- if the UE determines to vacate the first channel of the first communication technology or to stay on the first channel with the first communication technology and the second communication technology sharing the first channel via TDM, transmit a message to one or more other UEs, the message indicating the determination by the UE.

26. A user equipment (UE) for wireless communication, comprising:
- a memory; and
- at least one processor coupled to the memory and configured to:
  - detect whether a second communication technology different from a first communication technology utilized by the UE is active on a first channel;

perform, based on the detection, an action associated with assigning the first communication technology to at least one of the first channel or a second channel;

receive one or more messages indicating that at least one another UE has determined to vacate the first channel of the first communication technology or to stay on the first channel with the first communication technology and the second communication technology sharing the first channel via TDM; and relay the one or more messages to another UE.

27. A user equipment (UE) for wireless communication, comprising:

a memory; and at least one processor coupled to the memory and configured to:

detect whether a second communication technology different from a first communication technology utilized by the UE is active on a first channel;

perform, based on the detection, an action associated with assigning the first communication technology to at least one of the first channel or a second channel;

receive one or more messages indicating that at least one another UE has determined to vacate the first channel of the first communication technology or to stay on the first channel with the first communication technology and the second communication technology sharing the first channel via TDM;

relay the one or more message if a relay hop count is less than a relay hop count limit, wherein the one or more message indicates the relay hop count; and refrain from relaying the one or more message if the relay hop count is greater than or equal to the relay hop count limit.

28. A user equipment (UE) for wireless communication, comprising:

a memory; and at least one processor coupled to the memory and configured to:

detect whether a second communication technology different from a first communication technology utilized by the UE is active on a first channel; and perform, based on the detection, an action associated with assigning the first communication technology to at least one of the first channel or a second channel, wherein the at least one processor configured to perform the action is configured to:

determine, based on the detection, whether to stay on a first channel with the first communication technology, or to vacate the first channel of the first communication technology, or to stay on the first channel with the first communication technology and the second communication technology sharing the first channel via time division multiplex (TDM), wherein the action is performed based on the determination;

if the UE determines to vacate the first channel of the first communication technology, utilize the second channel with the first communication technology.

29. A non-transitory computer-readable medium storing computer executable code, comprising code to:

detect whether a second communication technology different from a first communication technology utilized by the UE is active on a first channel, wherein the code to detect whether the second communication technology is active on the first channel comprises code to:

monitor the first channel for one or more messages indicating that at least one another UE has determined to vacate the first channel of the first communication technology or to stay on the first channel with the first communication technology and the second communication technology sharing the first channel via TDM, wherein the code to detect whether the second communication technology is active on the first channel is based on the one or more messages; and perform, based on the detection, an action associated with assigning the first communication technology to at least one of the first channel or a second channel.

* * * * *